(12) United States Patent
Kim

(10) Patent No.: US 7,688,765 B2
(45) Date of Patent: Mar. 30, 2010

(54) TDD SWITCH OF TDD WIRELESS COMMUNICATION SYSTEM

(75) Inventor: Seong-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 11/751,811

(22) Filed: May 22, 2007

(65) Prior Publication Data

US 2007/0274238 A1    Nov. 29, 2007

(30) Foreign Application Priority Data

May 25, 2006    (KR) .................. 10-2006-0047000

(51) Int. Cl.
*H04L 5/14*    (2006.01)
(52) U.S. Cl. .............. 370/276; 370/280; 370/294; 370/287; 455/78
(58) Field of Classification Search .......... 370/276, 370/280, 294; 455/78, 126
See application file for complete search history.

(56) References Cited

U.S. PATENT DOCUMENTS

| | | | |
|---|---|---|---|
| 6,552,620 B2* | 4/2003 | Gitsevich et al. ......... | 331/99 |
| 6,591,086 B1* | 7/2003 | Pleasant ................ | 455/78 |
| 2002/0072339 A1* | 6/2002 | Hamalainen ............ | 455/126 |
| 2005/0255810 A1* | 11/2005 | Monroe ................. | 455/78 |
| 2005/0255812 A1* | 11/2005 | Na et al. ............... | 455/78 |
| 2006/0035600 A1* | 2/2006 | Lee et al. .............. | 455/78 |
| 2007/0002781 A1* | 1/2007 | Yoon et al. ............. | 370/280 |
| 2007/0049225 A1* | 3/2007 | Yoon .................... | 455/217 |

\* cited by examiner

*Primary Examiner*—Chi H Pham
*Assistant Examiner*—Robert Lopata
(74) *Attorney, Agent, or Firm*—Jefferson IP Law, LLP

(57) ABSTRACT

A Time Division Duplex (TDD) wireless communication system includes a switch connected to an output port of a transmitter, a first transmission line for transmitting a transmission signal and for isolating a transmission path according to a mode, a first transmission line stub connected between the isolator and the first transmission line for reflecting a transmission signal transmitted from the isolator, a second transmission line connected between an output port of the first transmission line and an input port of a receiver for isolating a reception path in the transmission mode and for providing a reception signal received from the antenna feed line to the receiver, and a second transmission line stub connected in a stub form between the second transmission line and the input port of the receiver, for controlling the second transmission line to isolate the reception path.

20 Claims, 17 Drawing Sheets

TDD SWITCH OF TDD WIRELESS COMMUNICATION SYSTEM

PRIORITY

This application claims the benefit under 35 U.S.C. §119 (a) of a Korean patent application filed in the Korean Intellectual Property Office on May 25, 2006 and assigned Serial No. 2006-47000, the entire disclosure of which is hereby incorporated by reference.

BACKGROUND OF THE INVENTION

1. Field of the Invention

The present invention relates to a Time Division Duplex (TDD) switch of a TDD wireless communication system. More particularly, the present invention relates to an apparatus for protecting a receiver when a high-power transmission signal is introduced to the receiver out of sync due to erroneous operations such as a malfunction of the TDD switch or when power of the TDD switch is blocked. In addition, the present invention relates to a TDD switch using a transmission line and a transmission line stub without having to use a conventional circulator.

2. Description of the Related Art

In general, a Time Division Duplex (TDD) wireless communication system uses a TDD switch to change its mode between a transmission mode and a reception mode. Such a mode change allows a transmission path to be separated from a reception path, so that a receiver can be protected when in the transmission mode. The TDD switch operates in response to a TDD control signal of the wireless communication system. The TDD switch is generally located as will now be described.

FIG. 1 illustrates a conventional TDD switch in a TDD wireless communication system.

Referring to FIG. 1, a TDD switch 107 is connected to a Power Amplifier (PA) 103, an antenna 111, and a Low Noise Amplifier (LNA) 115.

When the wireless communication system operates in the transmission mode, a transmission signal transmitted from a transmitter 101 is amplified to a high-power transmission signal by the PA 103 and is then radiated through the antenna 111 via a transmit port 105 and an antenna port 109. In this cases the TDD switch 107 operates in the transmission mode and thus isolates the transmitter 101 from a receiver 117. Therefore, the receiver 117 can be protected against the high-power transmission signal from the transmitter 101.

When the wireless communication system operates in the reception mode, a reception signal received through the antenna 111 is transmitted to a receive port 113 via the antenna port 109. In this case, the TDD switch 107 operates in the reception mode and thus enables the reception signal to be transmitted to the receive port 113. The reception signal itself has a significantly low power level due to attenuation and noise. Therefore, the reception signal is amplified by the LNA 115 in which a signal is amplified with minimum noise. The amplified reception signal is transmitted to the receiver 117.

FIGS. 2A and 2B illustrate a conventional TDD switch having a circulator and a λ/4 transmission line.

FIG. 2A illustrates a conventional TDD switch having a circulator 201 and a λ/4 transmission line 202. In FIG. 2A, the λ/4 transmission line 202 and a pin diode 203 are connected in three connection configurations. About 20 dB of signal attenuation can be prevented per each connection configuration. Thus, the three connection configurations shown in FIG. 2A can prevent about 60 dB of signal attenuation. The connection configurations are located between a receive port 206 and the circulator 201.

In the TDD communication transmission system, it will be assumed hereinafter that a transmit port 204 includes a PA, and the receive port 206 includes an LNA. An antenna is connected to an antenna port 205 of the TDD switch.

An isolator 207 transmits a signal only in one direction and is located between the transmit port 204 and the circulator 201. The isolator 207 is designed to pass only a transmission signal transmitted from the transmit port 204. Furthermore, the isolator 207 acts as a terminator for an introduced signal.

For example, when the transmission signal is not successfully radiated through the antenna and is thus reversely introduced, the isolator 207 terminates the introduced signal. Thus, the circuit of the transmit port 204 is protected.

The circulator 201 is a 3-port circuit element for branching signals. A resonance plate and a magnetic substance (e.g., ferrite) are placed inside the circulator 201 having a shape in which three ports are arranged by 120 degrees. The circulator 201 leads to an approximately 0.3 dB path loss when a power signal is transmitted in a direction from the isolator 207 to the antenna port 205. Also, the circulator 201 attenuates the power signal by a specific level (about 20 dB) in another direction from the circulator 201 to the receive port 206.

For example, when a TDD control signal operates in the transmission mode, the transmission signal amplified through the transmit port 204 exhibits an approximately 0.3 dB path loss while passing through the circulator 201 and is then radiated through the antenna via the antenna port 205. In the direction from the isolator 207 to the pin diode 203, the transmission signal is attenuated by a certain level (about 20 dB). The receive port 206 may be damaged when the attenuated transmission signal is introduced to the receive port 206.

The TDD control signal is used to control the transmit port 204 and the receive port 206 of the TDD wireless communication system. In response to the TDD control signal, the transmit port 204 amplifies the transmission signal and then radiates the amplified power signal to the antenna.

In addition, the TDD control signal is used to control a bias circuit 209 which regulates a Direct Current (DC) bias supplied to the pin diode 203. The DC bias is supplied to the pin diode 203 and is independent from wireless communication characteristics. The pin diode 203 acts as a part of the TDD switch according to the DC bias.

Although not shown in FIG. 2A, a capacitor is disposed between the circulator 201 and the λ/4 transmission line 202 so as to block the DC bias. Thus, the DC bias is prevented from being introduced to other circuits. Hereinafter, the capacitor for blocking the DC bias is assumed to be present throughout the figures.

According to transmission line theory, when the output port of the transmission line is open to ground, the impedance of the input port of the transmission line is expressed as $Z=-jZ_o \cot \beta l$. When the output port of the transmission line is shorted to ground, the impedance of the input port of the transmission line is expressed as $Z=-jZ_o \tan \beta l$. When the output port of the transmission line is connected to a 50 ohm transmission line, the impedance of the input port of the transmission line is expressed as $Z=Z_o=50$ ohm. Here, $\beta=2\pi/\lambda$, and $l$ is the length of the transmission line. As is known, waves have the same amplitudes at λ/4, 3λ/4, 5λ/4, 7λ/4, and so on. Hence, the λ/4 transmission line 202 may be generalized as a (λ/4)*(2m+1) transmission line [m=0, 1, 2, 3, ... ]. The λ/4 transmission line 202 corresponds to a (λ/4)*(2m+1) transmission line [m=0, 1, 2, 3, ... ], where m is 0.

The λ/4 transmission line 202 nearest to the receive port 206 is connected to the receive port 206. A nominal impedance of the λ/4 transmission line 202 is 50 ohm.

When the forward DC bias is supplied to the pin diode 203, the impedance of the pin diode 203 decreases. Thus, the impedance viewed from the λ/4 transmission line 202 towards the pin diode 203 becomes similar to a state of being connected to ground. In addition, when the impedance of one end of the λ/4 transmission line 202 decreases, according to the above expression of $Z=-jZo \tan \beta \ell$ where $\beta=2\pi/\lambda$, and $l=(\lambda/4)*(2m+1)[m=0, 1, 2, 3, \ldots]$, the impedance Z of the other end of the λ/4 transmission line 202 becomes nearly infinite (open-circuited).

Conversely, when the reverse DC bias is supplied to the pin diode 203, the impedance of the pin diode 203 increases. As a result, the impedance viewed from the λ/4 transmission line 202 towards the pin diode 203 becomes nearly 50 ohm since it is a parallel impedance between an infinite impedance (open-circuited) and a 50 ohm impedance. Specifically, when the impedance of the pin diode 203 increases, the λ/4 transmission line 202 is substantially connected only to the 50 ohm transmission line. Thus, according to the above expression of Zo=50 ohm, the impedance Z of the other end of the λ/4 transmission line 202 becomes nearly 50 ohm. This is similar to the case when the circulator 201 is directly connected to the receive port 206.

Consequently, impedance changes in the pin diode 203 in response to the DC bias allow the output port of the λ/4 transmission line 202 to become substantially shorted to ground or substantially connected only to the 50 ohm transmission line.

In the transmission mode, when the TDD control signal is transmitted to the bias circuit 209, the bias circuit 209 supplies a forward DC bias to the pin diode 203. The forward DC bias allows the impedance of the pin diode 203 to become nearly 0 (short-circuited). Therefore, the λ/4 transmission line 202 is substantially connected to ground. According to the characteristic of the λ/4 transmission line 202, the impedance of an input port of the λ/4 transmission line 202 changes to be opposite to the impedance of an output port of the λ/4 transmission line 202 and thus becomes nearly infinite (open-circuited).

Accordingly, the transmission signal transmitted from the isolator 207 to the circulator 201 is reflected, thereby protecting the receive port 206 against the transmission signal.

In the reception mode, when the TDD control signal is transmitted to the bias circuit 209, the bias circuit 209 supplies a reverse DC bias to the pin diode 203. The reverse DC bias allows the impedance of the pin diode 203 to become nearly infinite (open-circuited). Therefore, the λ/4 transmission line 202 is substantially directly connected to the receive port 206. In this case, the impedance of the output port of the λ/4 transmission line 202 becomes 50 ohm, and the impedance of the input port of the λ/4 transmission line 202 also becomes 50 ohm. Accordingly, most of the transmission signal can be transmitted from the antenna port 205 to the receive port 205 via the circulator 201.

FIG. 2B illustrates a conventional TDD switch having a circulator 211 and a λ/4 transmission line 212. In FIG. 2B, the λ/4 transmission line 212 and a pin diode 213 are connected in two connection configurations. About 20 dB of signal attenuation can be prevented per each connection configuration. Thus, the two connection configurations shown in FIG. 2B can prevent about 40 dB of signal attenuation. The connection configurations are located between a receive port 216 and the circulator 211. The operation of the TDD switch of FIG. 2B is the same as that of FIG. 2A. Also illustrated in FIG. 2B are elements similar to those in FIG. 2A such as a transmit port 214, an antenna port 215, an isolator 217 and a bias circuit 219.

FIGS. 3A to 3C illustrate a conventional TDD switch having a circulator, a λ/4 transmission line, a λ/4 transmission line stub, and a λ/2 transmission line stub.

Referring to FIG. 3A, the TDD switch includes an isolator 307, a circulator 301, pin diodes 306 and 304, a λ/4 transmission line 302, a λ/4 transmission line stub 303, and a λ/2 transmission line stub 305. The λ/2 transmission line stub 305 and the pin diode 306 are connected between the isolator 307 and the circulator 301 so as to act as a part of the TDD switch. In addition, the λ/4 transmission line 302, the λ/4 transmission line stub 303, and the pin diode 304 are connected between the circulator 301 and a receive port 310, so as to act as a part of the TDD switch. Also illustrated are a transmit port 308, an antenna port 309 and a bias circuit 311.

In general, a transmission line stub has a specific length and is perpendicularly attached to a transmission line. According to a connection state between the transmission line stub and ground, the transmission line stub may be either an open stub or a shorted stub. Similar to the transmission line, when used in a high frequency circuit, the transmission line stub may also have a characteristic of a specific circuit element. In addition, a λ/4 transmission line has the same characteristic as a λ/4 transmission line stub.

According to the transmission line theory, when the output port of the transmission line stub is not connected to ground (i.e., open stub), the impedance of the input port of the transmission line stub is expressed as $Z=-jZo \cot \beta l$. Further, when the output port of the transmission line stub is connected to ground (i.e., shorted stub), the impedance of the input port of the transmission line stub is expressed as $Z=-jZo \tan \beta l$. Here, $\beta=2\pi/\lambda$, and l is the length of the transmission line stub. As known, waves have the same amplitudes at 0, λ/2, λ, 3λ/2, 2λ, and so on. Hence, the λ/2 transmission line stub 305 may be generalized as a (λ/2)*m transmission line stub [m=0, 1, 2, 3, ...]. The λ/2 transmission line stub 305 corresponds to a (λ/2)*m transmission line stub [m=0, 1, 2, 3, ...], where m is 1.

The output port of the λ/2 transmission line stub 305 is connected to the pin diode 306. Impedance changes in the pin diode 306 in response to the DC bias allow the output port of the λ/2 transmission line stub 305 to become nearly shorted or open to ground.

When the output port of the λ/2 transmission line stub 305 becomes substantially open to ground, according to the above expressions of $Z=-jZo \cot \beta l$, $\beta=2\pi/\lambda$, and l=(λ/2)*m transmission line stub [m=0, 1, 2, 3, ...], the impedance Z of the input port of the λ/2 transmission line stub 305 becomes nearly infinite (open-circuited). Since the input port of the λ/2 transmission line stub 305 and a 50 ohm transmission line are connected in parallel to the isolator 307, when the impedance Z of the input port of the λ/2 transmission line stub 305 becomes nearly infinite (open-circuited), the input impedance viewed from the isolator 307 towards the circulator 301 becomes 50 ohm. This is the similar to the case when the λ/2 transmission line stub 305 and the pin diode 306 are not present.

On the other hand, when the output port of the λ/2 transmission line stub 305 becomes substantially shorted to ground, according to the above expressions $Z=-jZo \tan \beta l$, $\beta=2\pi/\lambda$, and l=(λ/2)*m transmission line stub [m=0, 1, 2, 3, ...], the impedance Z of the input port of the λ/2 transmission line stub 305 becomes nearly 0 (short-circuited).

In the transmission mode, when the TDD control signal is transmitted to the bias circuit 311, the bias circuit 311 supplies a reverse DC bias to the pin diodes 306 and 304. The reverse DC bias allows each of the impedances of the pin diodes 306 and 304 to become nearly infinite (open-circuited).

Since the output port of the $\lambda/2$ transmission line stub 305 (nearest to the pin diode 306) located between the isolator 307 and the circulator 301 is connected to the pin diode 306, the impedance of the output port of the $\lambda/2$ transmission line stub 305 also becomes nearly infinite. Hence, the output port of the $\lambda/2$ transmission line stub 305 becomes substantially open to ground (open-circuited).

Similar to the impedance of the output port of the $\lambda/2$ transmission line stub 305, according to the characteristic of the $\lambda/2$ transmission line stub 305, the impedance of the input port (nearest to the isolator 307) of the $\lambda/2$ transmission line stub 305 becomes nearly infinite (open-circuited). Accordingly, the input impedance viewed from the isolator 307 towards the circulator 301 becomes 50 ohm.

When the TDD control signal operates in the transmission mode, the reverse DC bias allows the impedance of the pin diode 304 located between the circulator 301 and the receive port 310 to become nearly infinite. Since the pin diode 304 is connected to the output port of the $\lambda/4$ transmission line stub 303, the impedance of the output port of the $\lambda/4$ transmission line stub 303 also becomes nearly infinite (open-circuited). Hence, the output port of the $\lambda/4$ transmission line stub 315 becomes substantially open to ground.

The impedance of the input port of the $\lambda/4$ transmission line stub 303 is nearly 0, similar to that of the $\lambda/4$ transmission line 212 of FIG. 21. The impedance of the output port of the $\lambda/4$ transmission line 302 becomes nearly 0 since it is a parallel impedance between 0 and 50 ohm.

The impedance of the input port (nearest to the circulator 301) of the $\lambda/4$ transmission line 302 becomes nearly infinite according to the characteristic of the $\lambda/4$ transmission line 302. Therefore, it is possible to isolate most of the power signal to be supplied from the circulator 301 to the receive port 310 while the wireless communication system operates in the transmission mode.

Consequently, when the wireless communication system operates in the transmission mode, the $\lambda/2$ transmission line stub 305 and the pin diode 306 operate as if they do not exist, and the receive port 310 is protected by the $\lambda/4$ transmission line 302, the $\lambda/4$ transmission line stub 303, and the pin diode 304. Therefore, the wireless communication system can perform a transmission operation without damaging the receive port 310.

In the reception mode, when the TDD control signal is transmitted to the bias circuit 311, the bias circuit 311 supplies a forward DC bias to the pin diodes 306 and 304. The forward DC bias allows each of the impedances of the pin diodes 306 and 304 to become nearly 0. Since the pin diode 306 located between the isolator 307 and the circulator 301 is connected to the output port of the $\lambda/2$ transmission line stub 305, the impedance of the output port of the $\lambda/2$ transmission line stub 305 also becomes nearly 0. Hence, the output port of the $\lambda/2$ transmission line stub 305 becomes substantially shorted to ground (short-circuited).

Similar to the impedance of the output port of the $\lambda/2$ transmission line stub 305, according to the characteristic of the $\lambda/2$ transmission line stub 305, the impedance of the input port (nearest to the isolator 307) of the $\lambda/2$ transmission line stub 305 becomes nearly 0.

Since the input port of the $\lambda/2$ transmission line stub 305 and the 50 ohm transmission line are connected in parallel to the isolator 307, when the impedance Z of the input port of the $\lambda/2$ transmission line stub 305 becomes nearly 0, the input impedance viewed from the isolator 307 towards the circulator 301 becomes nearly 0.

When the TDD switch abnormally operates, the TDD wireless communication system may operate in the transmission mode while the TDD switch operates in the reception mode. In this case, the transmission signal amplified through a transmit port 308 is reflected due to impedance changes in the pin diode 306 and is returned to the isolator 307, resulting in termination. Therefore, the circuit of the receive port 310 can be protected.

When the TDD control signal operates in the reception mode, the forward DC bias also allows the impedance of the pin diode 304 located between the circulator 301 and the receive port 310 to become nearly 0. Since the pin diode 304 is connected to the output port of the $\lambda/4$ transmission line stub 303, the impedance of the output port of the $\lambda/4$ transmission line stub 303 also becomes nearly 0. Therefore, the output port of the $\lambda/4$ transmission line stub 303 becomes substantially shorted to ground.

According to the characteristic of the $\lambda/4$ transmission line stub 303, the impedance of the input port of the $\lambda/4$ transmission line stub 303 changes to be opposite to the impedance of the output port of the $\lambda/4$ transmission line stub 303 and thus becomes nearly infinite.

Since the output port of the $\lambda/4$ transmission line 302 and the 50 ohm transmission line are connected in parallel to the input port of the $\lambda/4$ transmission line stub 303, the impedance of the output port of the $\lambda/4$ transmission line 302 becomes 50 ohm. As a result, the impedance of the input port (nearest to the circulator 301) of the $\lambda/4$ transmission line 302 becomes 50 ohm according to the characteristic of the $\lambda/4$ transmission line 302. This is similar to the case when the circulator 301 is directly connected to the receive port 310.

Consequently, when the wireless communication system operates in the reception mode, according to the operations of the $\lambda/2$ transmission line stub 305 and the pin diode 306, the output of the isolator 307 is reflected, and the reflected output is returned to the isolator 307, resulting in termination. Therefore, even if an abnormal output is produced from the isolator 307, the receive port 310 can be protected. In addition, the $\lambda/4$ transmission line 302, the $\lambda/4$ transmission line stub 303, and the pin diode 304 enable the receive port 310 to smoothly receive a signal transmitted through an antenna port 309.

FIG. 3B illustrates a TDD switch without the $\lambda/2$ transmission line stub 305 of FIG. 3A. This is equivalent to the case when m is 0 in a generalized $(\lambda/2)*m$ transmission line stub [m=0, 1, 2, 3, ... ]. Other components and operations of the TDD switch of FIG. 3B are the same as those of FIG. 3A. For example, similar to that illustrated in FIG. 3A, FIG. 3B includes an isolator 326, a circulator 321, pin diodes 324 and 325, a $\lambda/4$ transmission line 322 and a $\lambda/4$ transmission line stub 323. The $\lambda/4$ transmission line 322, the $\lambda/4$ transmission line stub 323, and the pin diode 324 are connected between the circulator 321 and a receive port 329. Also illustrated are a transmit port 327, an antenna port 328 and a bias circuit 331.

FIG. 3C illustrates the same TDD switch as shown in FIG. 3B except that a $\lambda/4$ transmission line 322, a $\lambda/4$ transmission line stub 323, and a pin diode 324 of FIG. 3B are connected in two connection configurations. More specifically, the TDD switch of FIG. 3C includes a $\lambda/4$ transmission line 352, a $\lambda/4$ transmission line stub 353, and pin diodes 354 and 360. About 20 dB of signal attenuation can be prevented per each connection configuration. Thus, the two connection configurations shown in FIG. 3C can prevent about 40 dB of signal attenuation. Other components and operations of the TDD switch of FIG. 3C are the same as those of FIG. 3B. For example, similar to that illustrated in FIG. 3B, FIG. 3C includes an isolator 356, a circulator 351, and pin diode 355. Also illustrated are a transmit port 357, an antenna port 358, a receive port 359 and a bias circuit 361.

As described above, the TDD switch of FIGS. 2A and 2B has a problem in that it cannot be separated by the circulator when errors occur in the antenna port (i.e., a signal is not properly radiated through the antenna). Moreover, when the TDD wireless communication system operates in the transmission mode while the TDD switch operates in the reception mode, a transmission signal may be introduced to the receive port without being blocked by the TDD switch, thereby damaging the circuit of the receive port.

Furthermore, in the TDD switch of FIGS. 2A, 2B, 3A, 3B and 3C, about 0.3 dB of signal attenuation is produced while a signal is transmitted or received, due to the use of the circulator. In addition, the circulator is provided as an additional hardware, thereby increasing a size of the TDD. Accordingly, there is a demand for a TDD switch that can protect the receive port without having to use the circulator when the TDD switch abnormally operates.

SUMMARY OF THE INVENTION

An aspect of the present invention is to address at least the above-mentioned problems and/or disadvantages and to provide at least the advantages described below. Accordingly, an aspect of the present invention is to provide a Time Division Duplex (TDD) switch that protects a receive port in a wireless communication system.

Another aspect of the present invention is to provide a TDD switch that protects the receive port even when the TDD wireless communication system abnormally operates due to errors.

Yet a further aspect of the present invention is to provide a TDD switch that protects the receive port without having to use a circulator in a TDD wireless communication system.

According to one aspect of the present invention, a TDD switch in a wireless communication system is provided. The switch includes an isolator connected to an output port of a transmitter, a first transmission line which is connected between the isolator and an antenna feed line, for transmitting a transmission signal received from the isolator to the antenna feed line when in a transmission mode and for isolating a transmission path when in a reception mode, a first transmission line stub which is connected in a stub form between the isolator and the first transmission line for reflecting the transmission signal transmitted from the isolator in the transmission mode and for changing an impedance of the first transmission line in the reception mode, a second transmission line connected between an output port of the first transmission line and an input port of a receiver for isolating a reception path in the transmission mode and for providing a reception signal received from the antenna feed line to the receiver in the reception mode and a second transmission line stub connected in a stub form between the second transmission line and the input port of the receiver, for controlling the second transmission line to isolate the reception path when in the transmission mode and for supplying the reception signal provided from the antenna feed line to the receiver when in the reception mode.

BRIEF DESCRIPTION OF THE DRAWINGS

The above and other aspects, features and advantages of certain exemplary embodiments will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, in the following description, well-known functions or constructions are omitted for clarity and conciseness.

The present invention relates to a Time Division Duplex (TDD) switch for protecting a receive port without having to use a circulator in a TDD wireless communication system when operating abnormally due to errors.

An exemplary TDD switch is illustrated throughout FIGS. 4 to 11 as will be described below. FIGS. 8 to 11 are exploded views for showing the structures depicted in FIGS. 4 to 7, respectively.

Figure 4:
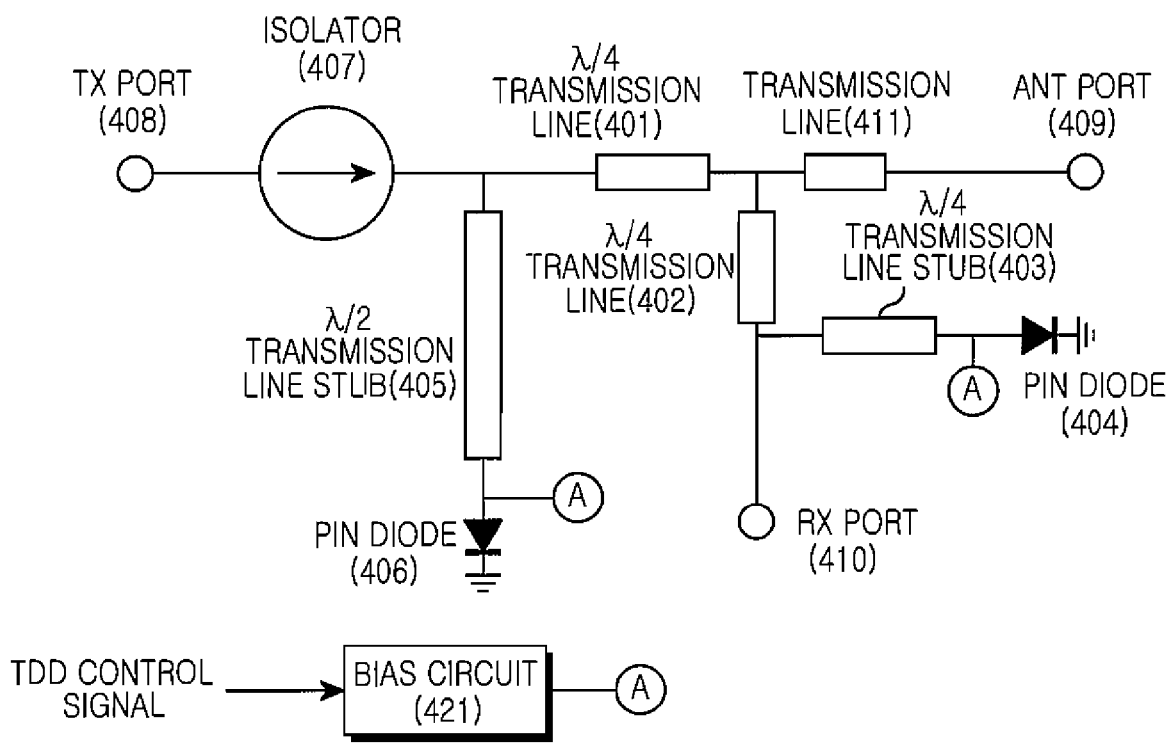
FIG. 4 illustrates a TDD switch having a $\lambda/4$ transmission line, a $\lambda/4$ transmission line stub, and a $\lambda/2$ transmission line stub and not having a circulator according to an exemplary embodiment of the present invention.
Figure 5:
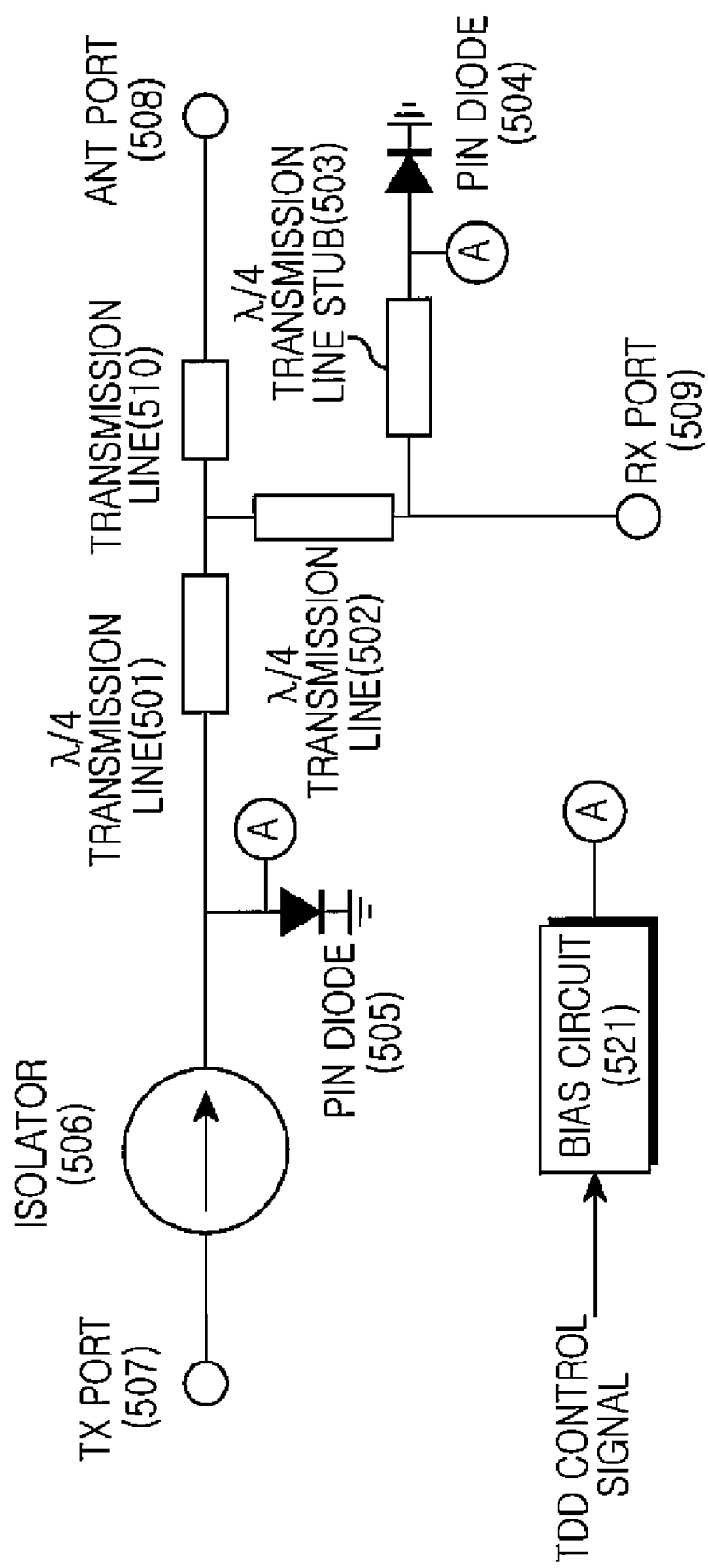
FIG. 5 illustrates a TDD switch when a $\lambda/2$ transmission line stub of FIG. 4 is removed according to an exemplary embodiment of the present invention.
Figure 6:
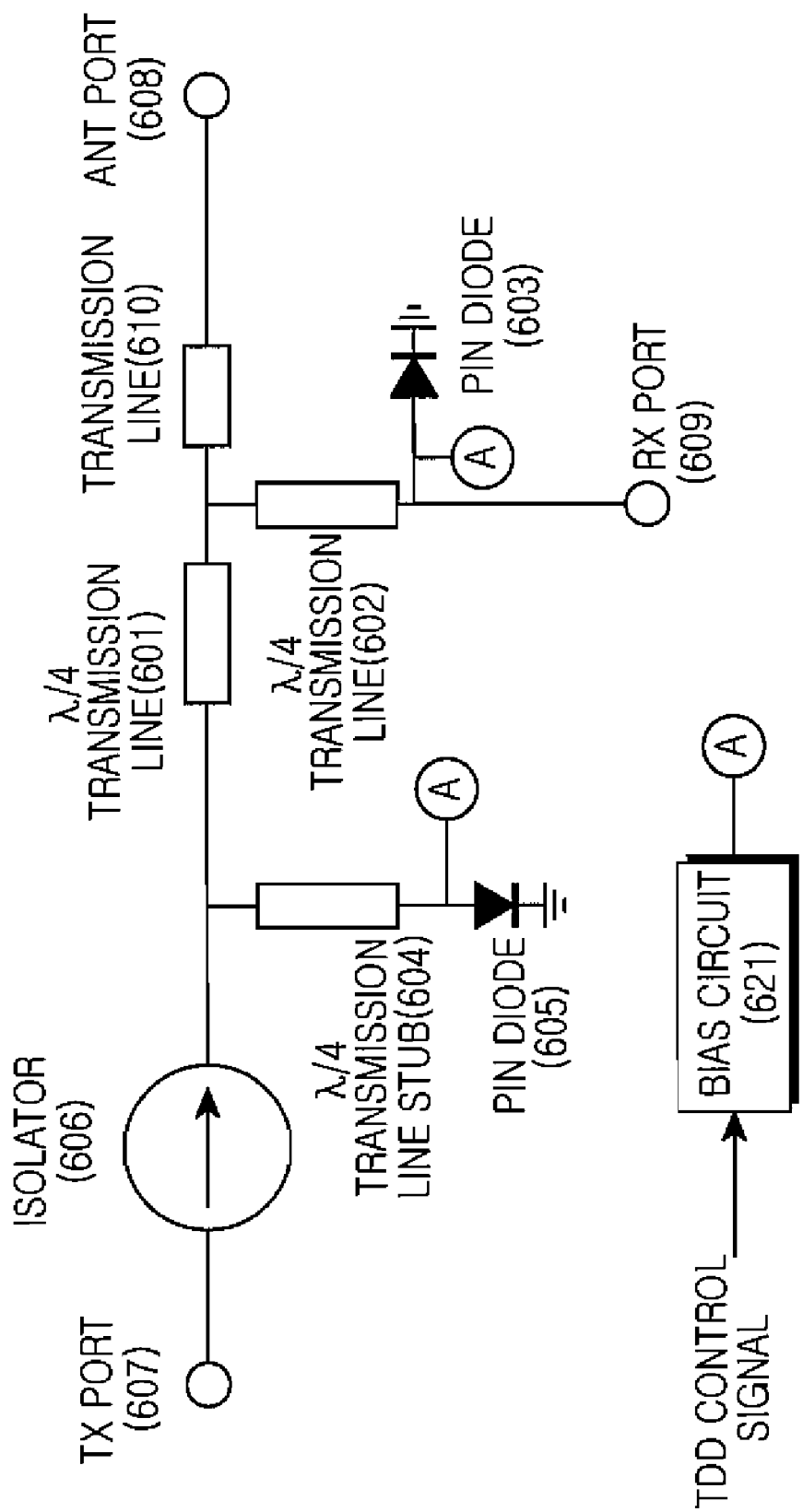
FIG. 6 illustrates a TDD switch having a $\lambda/4$ transmission line and a $\lambda/4$ transmission line stub and not having a circulator according to an exemplary embodiment of the present invention.

In FIGS. 4 to 11, λ/4 transmission lines 401, 402, 501, 502, 601, 602, 701, and 702 are examples of a (λ/4)*(2m+1) transmission line [m=0, 1, 2, 3, . . . ]. Further, λ/4 transmission line stubs 403, 503, 604, and 705 are examples of a (λ/4)*(2m+1) transmission line stub [m=0, 1, 2, 3, . . . ]. Furthermore, λ/2 transmission line stubs 405 and 703 are examples of a (λ/2)*m transmission line stub [m=0, 1, 2, 3, . . . ]. These elements have the same characteristics when m is an integer equal to or greater than 0. Therefore, the structure of FIG. 4 is similar to that of FIG. 5, and the structure of FIG. 6 is similar to that of FIG. 7.

FIG. 4 illustrates a TDD switch having a λ/4 transmission line, a λ/4 transmission line stub, and a λ/2 transmission line stub and not having a circulator according to the present invention. The TDD switch of FIG. 4 includes an isolator 407, the (λ/2)*m transmission line stub (where m=1, hereinafter referred to as a λ/2 transmission line stub) 405, pin diodes 406 and 404, the (λ/4)*(2m+1) transmission line stub (where m=0, hereinafter referred to as a 214 transmission line stub 403), and the (λ/4)*(2m+1) transmission lines (where m=0, hereinafter referred to as λ/4 transmission lines 401 and 402). A transmission line 411 disposed near an antenna port 409 has an arbitrary length, and may be referred to as an antenna feed line. The transmission line 411 is connected to the λ/4 transmission lines 401 and 402. The isolator 407 terminates a signal introduced after being reflected, and protects the output port of a power amplifier. In the transmission mode, a TDD control signal is supplied to a bias circuit 421, and the bias circuit 421 then supplies a reverse bias to the pin diodes 406 and 404. As a result, the impedance of the pin diode 406 becomes nearly infinite, and thus the impedance viewed from a transmission path (in a direction from the isolator 407 to the λ/4 transmission line 401) to the pin diode 406 also becomes nearly infinite according to the characteristics of the λ/2 transmission line stub 405. The impedance of the output port of the λ/2 transmission line stub 405 becomes nearly infinite, and according to the transmission line theory, the impedance of the input port of the λ/2 transmission line stub 405 also becomes nearly infinite. Thus, the λ/2 transmission line stub 405 becomes substantially open to the transmission path. Accordingly, a transmission signal transmitted from a transmit port 408 is transmitted to the λ/4 transmission line 401 without loss.

The reverse bias is also supplied to the pin diode 404 connected to the λ/4 transmission line stub 403. Thus, the impedance of the pin diode 404 also becomes nearly infinite. As a result, the impedance of the output port of the λ/4 transmission line stub 403 also becomes nearly infinite, and according to the transmission line theory, the impedance of the input port of the λ/4 transmission line stub 403 becomes close to 0. In other words, according to characteristics of the λ/4 transmission line stub 403, the impedance viewed from the intersection of the λ/4 transmission line 402 and the λ/4 transmission line stub 403 towards the pin diode 404 becomes nearly 0.

Since the output port of the λ/4 transmission line 402 is connected to the input port of the λ/4 transmission line stub 403, the impedance of the output port of the λ/4 transmission line 402 is nearly 0. Thus, according to the transmission line theory, the impedance of the input port of the λ/4 transmission line 402 becomes nearly infinite. In other words, the impedance viewed from the intersection of the λ/4 transmission line 402, the λ/4 transmission line 401, and the transmission line 411 towards a receive port 410 becomes nearly infinite.

Consequently, without having to use the circulator, the transmission signal transmitted from the transmit port 408 passes through the λ/4 transmission line 401 without loss and is totally reflected from the λ/4 transmission line 402 rather than being introduced to the λ/4 transmission line 402. The transmission signal is then transmitted to the antenna port 409 and is radiated through an antenna. Accordingly, the receive port 410 is isolated from the transmit port 408, and thus the receive port 410 can be protected against the large-power transmission signal transmitted from the transmit port 408.

In the reception mode, a TDD control signal is supplied to the bias circuit 421, and the bias circuit 421 then supplies a forward bias to the pin diodes 406 and 404. As a result, the impedance of the pin diode 406 becomes nearly 0, and thus the impedance viewed from a transmission path (in a direction from the isolator 407 to the λ/4 transmission line 401) to the pin diode 406 also becomes nearly 0 due to the λ/2 transmission line stub 405. The impedance of the output port of the λ/2 transmission line stub 405 becomes nearly 0, and according to the transmission line theory, the impedance of the input port of the λ/2 transmission line stub 405 also becomes nearly 0. Thus, the transmission path is substantially short-circuited. Accordingly, a transmission signal transmitted from the transmit port 408 is totally reflected so that the isolator 407 is isolated from the λ/4 transmission line 401 with about 20 dB isolation. The transmit port 408 maintains this isolation with respect to the receive port 410.

According to the connection configuration between the λ/2 transmission line stub 405 and the pin diode 406, the impedance viewed from the intersection of the λ/4 transmission line 401 and the λ/2 transmission line stub 405 towards the transmit port 408 becomes nearly 0. In addition, according to the characteristics of the λ/4 transmission line 401, the impedance viewed from the intersection of the λ/4 transmission line 401, the transmission line 411, and the λ/4 transmission line 402 towards the transmit port 408 becomes nearly infinite. Therefore, the signal received through the antenna port 409 is not introduced towards the transmit port 408.

Meanwhile, the impedance of the pin diode 404 connected to the λ/4 transmission line stub 403 becomes nearly 0, and according to the characteristics of the λ/4 transmission line stub 403, the impedance viewed from the intersection between the λ/4 transmission line 402 and the λ/4 transmission line stub 403 becomes nearly infinite. As a result, the impedance viewed from the intersection of the λ/4 transmission line 401, the transmission line 411, and the λ/4 transmission line 402 towards the receive port 410 is similar to the impedance measured when the λ/4 transmission line stub 403 and the pin diode 404 are not present. Therefore, the signal received through the antenna port 409 is readily transmitted towards the receive port 410.

Consequently, in the TDD switch not having the circulator according to the present invention, even when the TDD communication system operates in the transmission mode in a state that the TDD control signal is provided out of sync, it is possible to protect the receive port 410 due to the connection configuration of the λ/4 transmission line 401, the λ/2 transmission line stub 405, and the pin diode 406.

Furthermore, the antenna feed line may have a trouble (e.g., a cable connected to the antenna port 409 is broken), or a transmission signal may be reflected when a Voltage Standing Wave Ratio (VSWR) increases due to impedance mismatching. Even in this case, according to the configuration structure of the λ/4 transmission line 402, the λ/4 transmission line stub 403, and the pin diode 404, the receive port 410 can be protected. When power supplied to the TDD switch is blocked, the impedances of the pin diodes 404 and 406 become nearly infinite, which is the same as the case when operating in the transmission mode. Therefore, the receive port 410 can be protected.

The number of connection configurations of the λ/4 transmission line 402, the λ/4 transmission line stub 403, and the pin diode 404 or the number of connection configurations of the λ/2 transmission line stub 405, the λ/4 transmission line 401, and the pin diode 406 may vary according to which standard is adopted. In general, isolation can be secured by about 20 dB per each connection configuration.

FIG. 5 illustrates a TDD switch when the λ/2 transmission line stub 405 of FIG. 4 is removed according to an exemplary embodiment of the present invention.

Referring to FIG. 5, the λ/2 transmission line stub 405 of FIG. 4 is not present. This is equivalent to the case when m is 0 in a generalized (λ/2)*m transmission line stub [m=0, 1, 2, 3, . . . ]. Other components and operations of the TDD switch of FIG. 5 are the same as those of FIG. 4. For example, the TDD switch of FIG. 5 includes a transmit port 507, an isolator 506, pin diodes 504 and 505, transmission line 510, antenna port 508, receive port 509 and bias circuit 521.

FIG. 6 illustrates a TDD switch having a λ/4 transmission line 601 and a λ/4 transmission line stub 604 and not having a circulator according to an exemplary embodiment of the present invention.

The TDD switch of FIG. 6 has the same structure as that of FIG. 7 to be described below except that the λ/2 transmission line stub 703 is not present. This is equivalent to the case when m is 0 in a generalized (λ/2)*m transmission line stub [m=0, 1, 2, 3, . . . ]. Other components and operations of the TDD switch of FIG. 6 are the same as those of FIG. 7 as will be described below.

Figure 7:
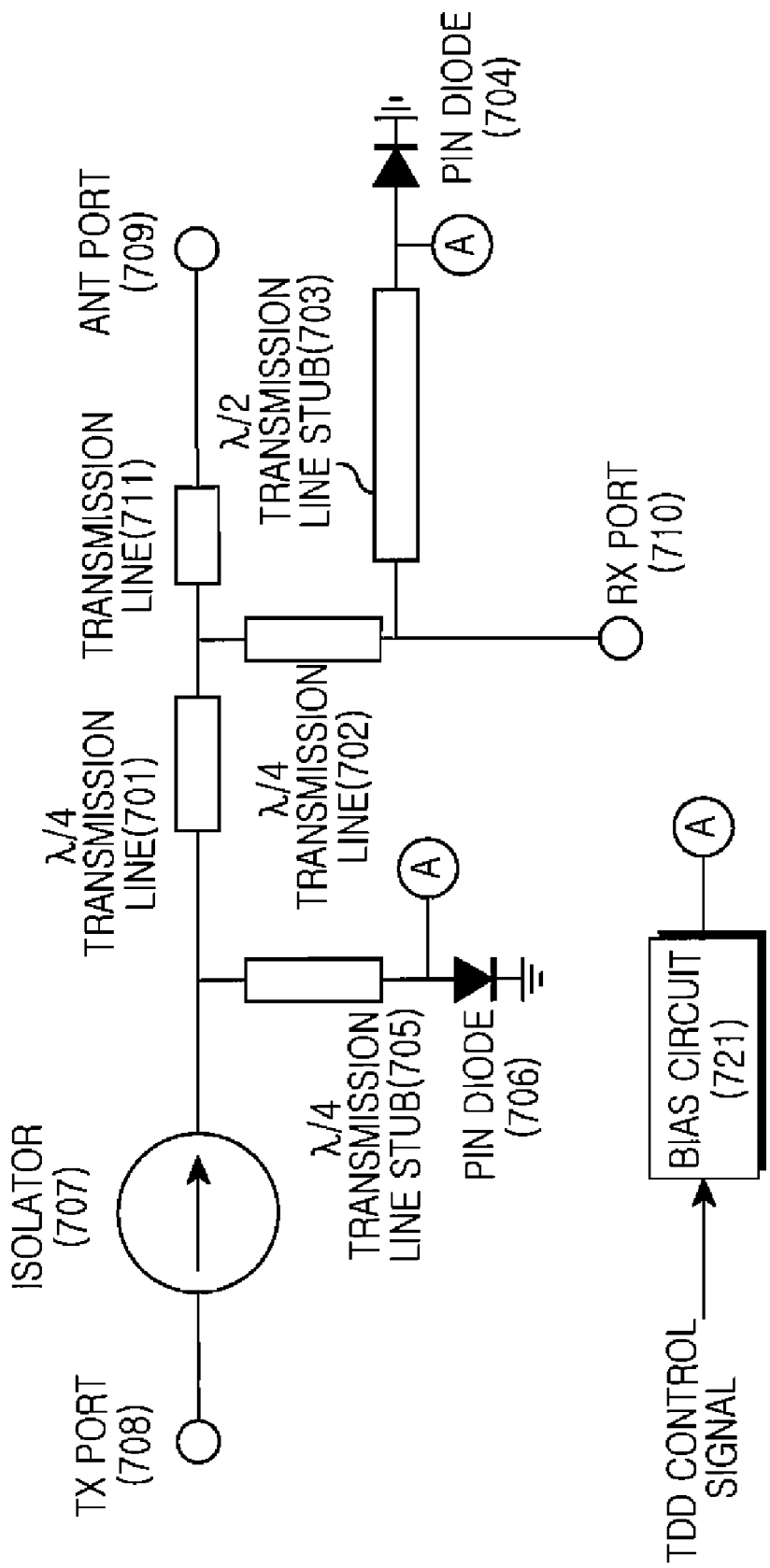
FIG. 7 illustrates a TDD switch equivalent to that shown in FIG. 6 except that a $\lambda/2$ transmission line stub is added according to an exemplary embodiment of the present invention.

FIG. 7 illustrates a TDD switch substantially equivalent to that shown in FIG. 6 except that a 212 transmission line stub is added according to an exemplary embodiment of the present invention.

The TDD switch of FIG. 7 includes an isolator 707, the (λ/4)+(2m+1) transmission line stub (where m=0, hereinafter referred to as a 214 transmission line stub 705), pin diodes 706 and 704, the (λ/4)*(2m+1) transmission line (where m=0, hereinafter referred to λ/4 transmission lines 701 and 702), and the (λ/2)*m transmission line stub (where m=1, hereinafter referred to as a λ/2 transmission line stub 703).

A transmission line 711 disposed near an antenna port 709 has an arbitrary length, and may be referred to as an antenna feed line. The transmission line 711 is connected to the λ/4 transmission lines 701 and 702. The isolator 707 terminates a signal introduced after being reflected, and protects the output port of a power amplifier.

In the transmission mode, a TDD control signal is supplied to a bias circuit 721, and the bias circuit 721 then supplies a forward bias to the pin diodes 706 and 704. As a result, the impedance of the pin diode 706 becomes nearly 0, and thus the impedance viewed from a transmission path (in a direction from the isolator 707 to the λ/4 transmission line 701) to the pin diode 706 becomes nearly infinite according to the characteristics of the λ/4 transmission line stub 705. Thus, the λ/4 transmission line stub 705 becomes substantially open to the transmission line. Accordingly, a transmission signal transmitted from a transmit port 708 is transmitted to the λ/4 transmission line 701 without loss.

The forward bias is also supplied to the pin diode 704 connected to the λ/2 transmission line stub 703. Thus, the impedance of the pin diode 704 also becomes nearly 0. As a result, the impedance of the output port of the λ/2 transmission line stub 703 also becomes nearly 0, and according to the transmission line theory, the impedance of the input port of the λ/2 transmission line stub 703 becomes close to 0. In other words, according to characteristics of the λ/2 transmission line stub 703, the impedance viewed from the intersection of the λ/4 transmission line 702 and the λ/2 transmission line stub 703 towards the pin diode 704 becomes nearly 0.

Since the output port of the λ/4 transmission line 702 is connected to the input port of the λ/2 transmission line stub 703, the impedance of the output port of the λ/4 transmission line 702 is nearly 0. Thus, according to the transmission line theory, the impedance of the input port of the λ/4 transmission line 702 becomes nearly infinite. In other words, the impedance viewed from the intersection of the λ/4 transmission line 702, the λ/4 transmission line 701, and the transmission line 711 towards a receive port 710 becomes nearly infinite.

Consequently, in the TDD switch not having the circulator, the transmission signal transmitted from the transmit port 708 passes through the λ/4 transmission line 701 without loss and is reflected from the λ/4 transmission line 702 rather than being introduced to the λ/4 transmission line 702. The transmission signal is then transmitted to the antenna port 709 and is radiated through an antenna. Accordingly, the receive port 710 is isolated from the transmit port 708, and thus the receive port 710 can be protected against the large-power transmission signal transmitted from the transmit port 708.

In the reception mode, the TDD control signal is supplied to the bias circuit 721, and the bias circuit 721 then supplies a reverse bias to the pin diodes 706 and 704. As a result, the impedance of the pin diode 706 becomes nearly infinite, and thus the impedance viewed from a transmission path (in a direction from the isolator 707 to the λ/4 transmission line 701) to the pin diode 706 becomes nearly 0 according to the characteristics of the λ/4 transmission line stub 705. The impedance of the output port of the λ/4 transmission line stub 705 becomes substantially shorted to the transmission path. Accordingly, the transmission signal transmitted from the transmit port 708 is totally reflected so that the isolator 707 is isolated from the λ/4 transmission line 701 with about 20 dB isolation. The transmit port 708 maintains this isolation with respect to the receive port 710. According to the connection configuration of the λ/4 transmission line stub 705 and the pin diode 706, the impedance viewed from the intersection of the λ/4 transmission line 701 and the λ/4 transmission line stub 705 towards the transmit port 708 becomes nearly 0. In addition, according to the characteristics of the λ/4 transmission line 701, the impedance viewed from the intersection of the λ/4 transmission line 701, the transmission line 711, and the λ/4 transmission line 702 towards the transmit port 708 becomes nearly infinite. Therefore, the signal received through the antenna port 709 is not introduced towards the transmit port 708.

Meanwhile, the impedance of the pin diode 704 connected to the λ/2 transmission line stub 703 becomes nearly infinite, and according to the characteristics of the λ/2 transmission line stub 703, the impedance viewed from the intersection between the λ/4 transmission line 702 and the λ/2 transmission line stub 703 becomes nearly infinite. As a result, the impedance viewed from the intersection of the λ/4 transmission line 701, the transmission line 711, and the λ/4 transmission line 702 towards the receive port 710 is similar to the impedance measured when the λ/2 transmission line stub 703 and the pin diode 704 are not present. Therefore, the signal received through the antenna port 709 is readily transmitted towards the receive port 710.

Consequently, in the TDD switch not having the circulator according to an exemplary embodiment of the present invention, even when the TDD communication system operates in the transmission mode in a state that the TDD control signal is provided out of sync, it is possible to protect the receive port 710 due to the connection configuration of the λ/4 transmission line 701, the λ/4 transmission line stub 705, and the pin diode 706.

Furthermore, the antenna feed line may have a trouble (e.g., a cable connected to the antenna port 709 is broken), or a transmission signal may be reflected when a VSWR increases due to impedance mismatching. Even in this case, according to the exemplary configuration structure of the λ/4 transmission line 702, the λ/2 transmission line stub 703, and the pin diode 704, the receive port 710 can be protected. Power supplied to the TDD switch may be blocked. Since this is similar to the case when the reverse bias is provided, the impedances of the pin diodes 704 and 706 become nearly infinite. In addition, isolation can be secured according to the exemplary connection configuration of the λ/4 transmission line 701, the λ/4 transmission line stub 705, and the pin diode 706, thereby protecting the receive port 710.

The number of connection configurations of the λ/4 transmission line 702, the λ/2 transmission line stub 703, and the pin diode 704 or the number of connection configurations of the λ/4 transmission line stub 705, the λ/4 transmission line 701, and the pin diode 706 may vary according to which standard is adopted. In general, isolation can be secured by about 20 dB per each connection configuration.

With reference again to FIG. 6, the TDD switch of FIG. 6 has the same structure as that of FIG. 7 except that the λ/2 transmission line stub 703 is not present. This is equivalent to the case when m is 0 in a generalized (λ/2)*m transmission line stub [m=0, 1, 2, 3, . . . ]. Other components and operations of the TDD switch of FIG. 6 are the substantially the same as those of FIG. 7. For example, an exemplary embodiment shown in FIG. 6 includes a transmit port 607, an isolator 606, a transmission line 610, an antenna port 608, a receive port 609, pin diodes 603 and 605 and a bias circuit 621.

Figure 8:
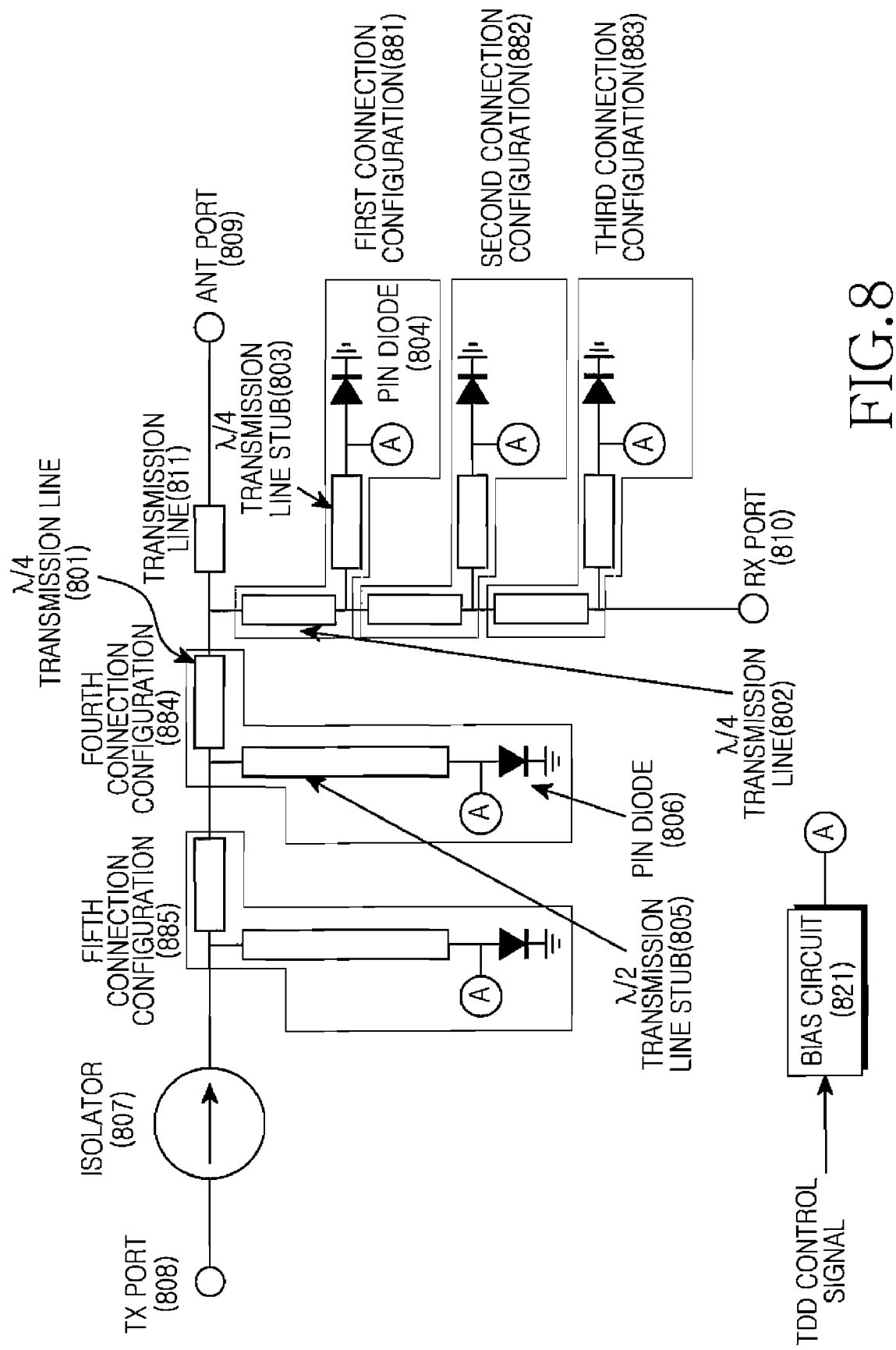
FIG. 8 illustrates a TDD switch having a plurality of connection configurations each illustrated in FIG. 4 according to an exemplary embodiment of the present invention.

FIG. 8 illustrates a TDD switch having a plurality of connection configurations similar to that illustrated in FIG. 4 according to an exemplary embodiment of the present invention.

Referring to FIG. 8, the TDD switch has three connection configurations (first to third connection configurations) 881, 882, and 883 in which, similar to that shown in FIG. 4, the λ/4 transmission line 402 (here 802), the λ/4 transmission line stub 403 (here 803), and the pin diode 404 (here 804) included in the TDD of FIG. 4 are connected, and two connection configurations (fourth and fifth connection configurations) 884 and 885 in which, similar to that shown in FIG. 4, the λ/2 transmission line stub 405 (here 805), the λ/4 transmission line 401 (here 801), and the pin diode 406 are connected (here 806). In general, isolation can be secured by about 20 dB per each connection configuration. Components and operations of the TDD switch of FIG. 8 are the same as those of FIG. 4. For example, as shown in FIG. 8, an exemplary embodiment further includes a transmit port 808, an isolator 807, a transmission line 811, an antenna port 809, a receive port 810 and a bias circuit 821.

Figure 9:
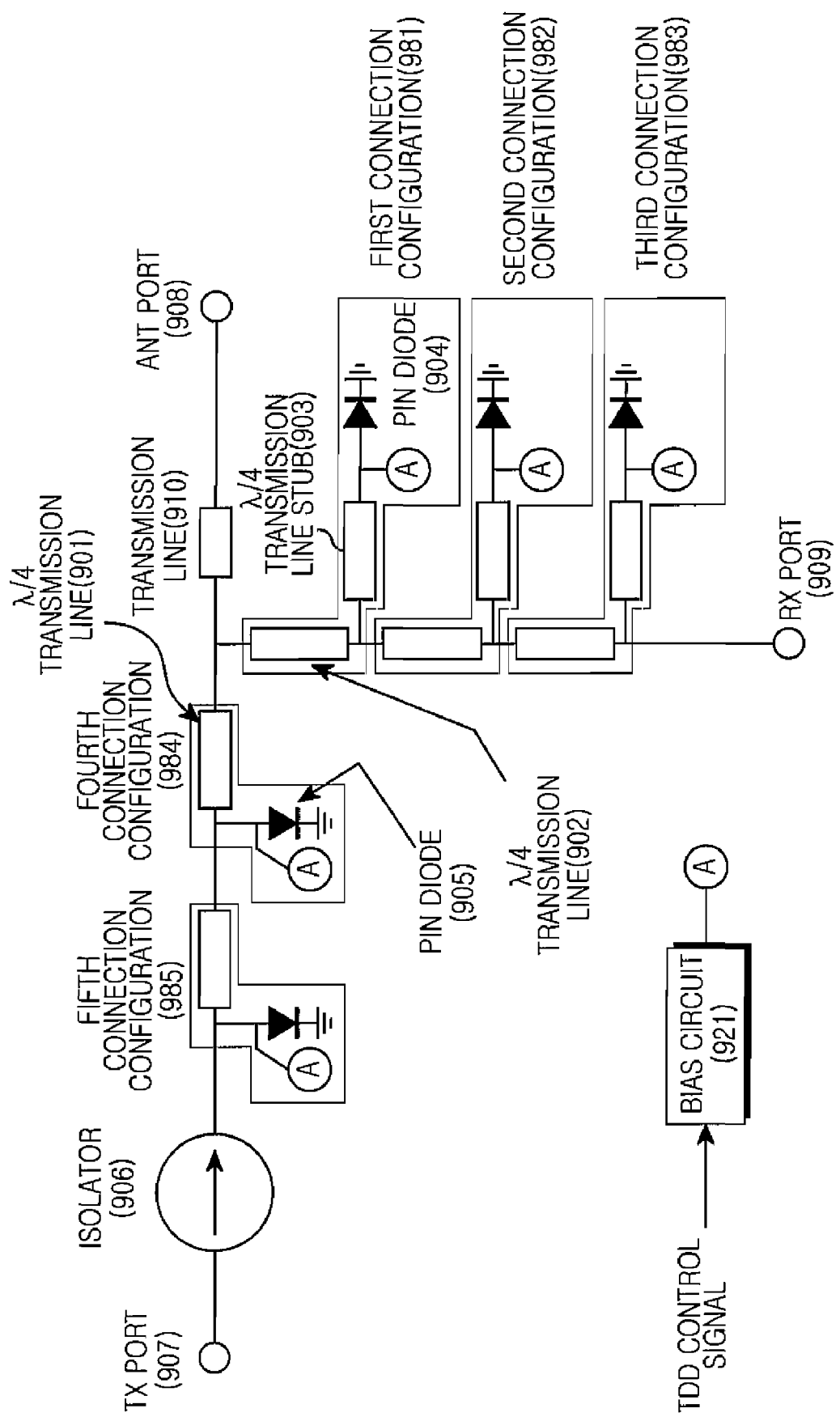
FIG. 9 illustrates a TDD switch having a plurality of connection configurations each illustrated in FIG. 5 according to an exemplary embodiment of the present invention.

FIG. 9 illustrates a TDD switch having a plurality of connection configurations similar to that illustrated in FIG. 5 according to an exemplary embodiment of the present invention.

Referring to FIG. 9, the TDD switch has three connection configurations (first to third connection configurations) 981, 982, and 983 in which, similar to that shown in FIG. 5, the λ/4 transmission line 502 (here 902), the λ/4 transmission line stub 503 (ere 903), and the pin diode 504 (ere 904) included in the TDD of FIG. 5 are connected, and two connection configurations (fourth and fifth connection configurations) 984 and 985 in which, similar to that shown in FIG. 5, the λ/4 transmission line 501 (here 901), and the pin diode 505 (here 905) are connected. Similar to that shown in FIG. 5, in the TDD switch of FIG. 9, the λ/2 transmission line stub is not present. This is equivalent to the case when m is 0 in a generalized (λ/2)*m transmission line stub [m=0, 1, 2, 3, . . . ]. In general, isolation can be secured by about 20 dB per each connection configuration. Components and operations of the TDD switch of FIG. 9 are the same as those of FIG. 5. For example, the TDD switch of FIG. 9 includes a transmit port 907, an isolator 906, transmission line 910, an antenna port 908, a receive port 909 and a bias circuit 921.

Figure 10:
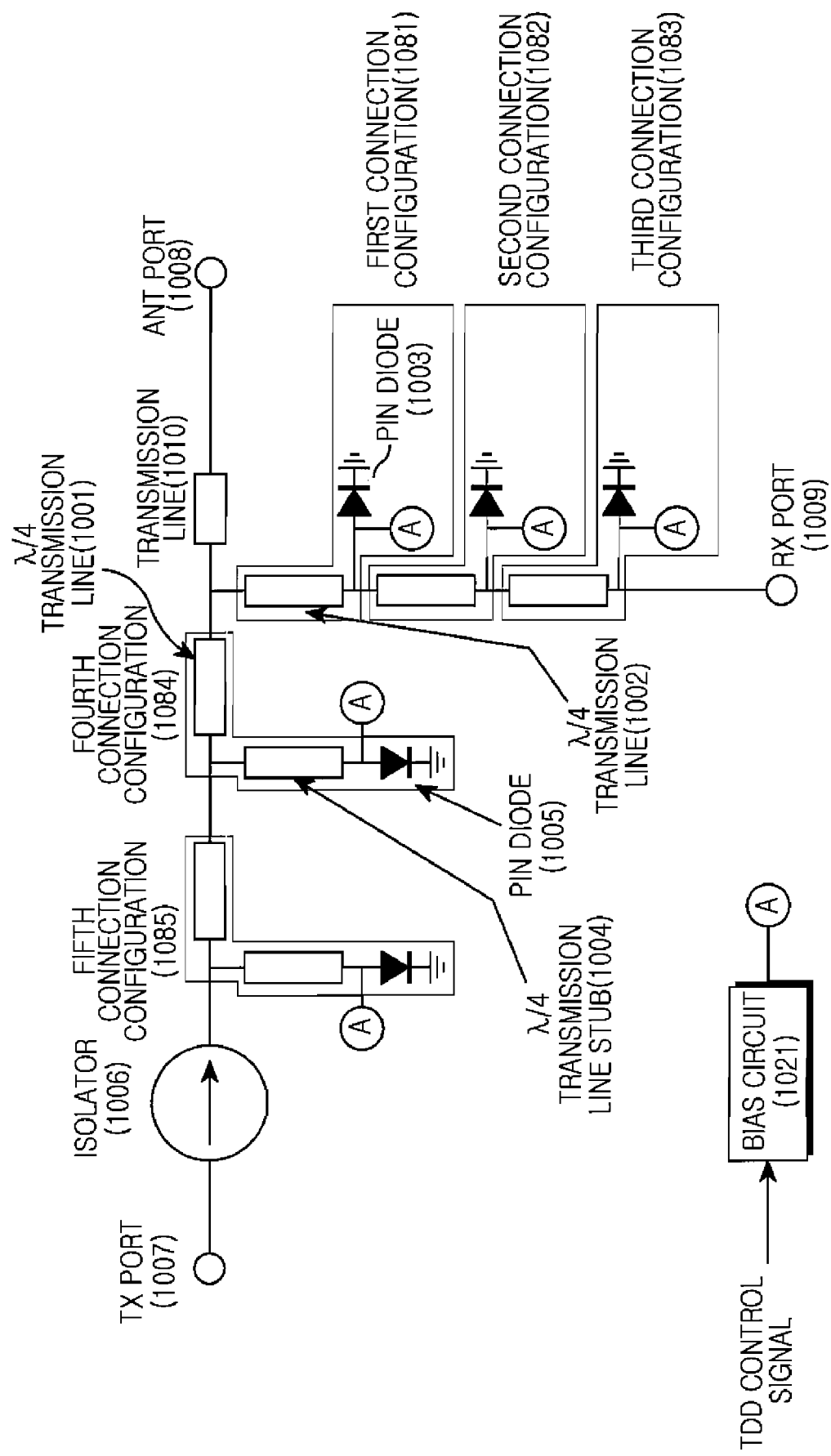
FIG. 10 illustrates a TDD switch having a plurality of connection configurations each illustrated in FIG. 6 according to an exemplary embodiment of the present invention.

FIG. 10 illustrates a TDD switch having a plurality of connection configurations similar to that illustrated in FIG. 6 according to an exemplary embodiment of the present invention.

Referring to FIG. 10, the TDD switch has three connection configurations (first to third connection configurations) 1081, 1082, and 1083 in which, similar to that shown in FIG. 6, the λ/4 transmission line 602 (here 1002) and the pin diode 603 (here 1003) are connected, and two connection configurations (fourth and fifth connection configurations) 1084 and 1085 in which, similar to that shown in FIG. 6, the λ/4 transmission line stub 604 (here 1004), the λ/4 transmission line 601 (here 1001), and the pin diode 605 (here 1005) are connected. In general, isolation can be secured by about 20 dB per each connection configuration.

Components and operations of the TDD switch of FIG. 10 are the substantially the same as those of FIG. 6. For example, the TDD switch of FIG. 10 includes a transmit port 1007, an isolator 1006, transmission line 1010, an antenna port 1008, a receive port 1009 and a bias circuit 1021.

Figure 11:
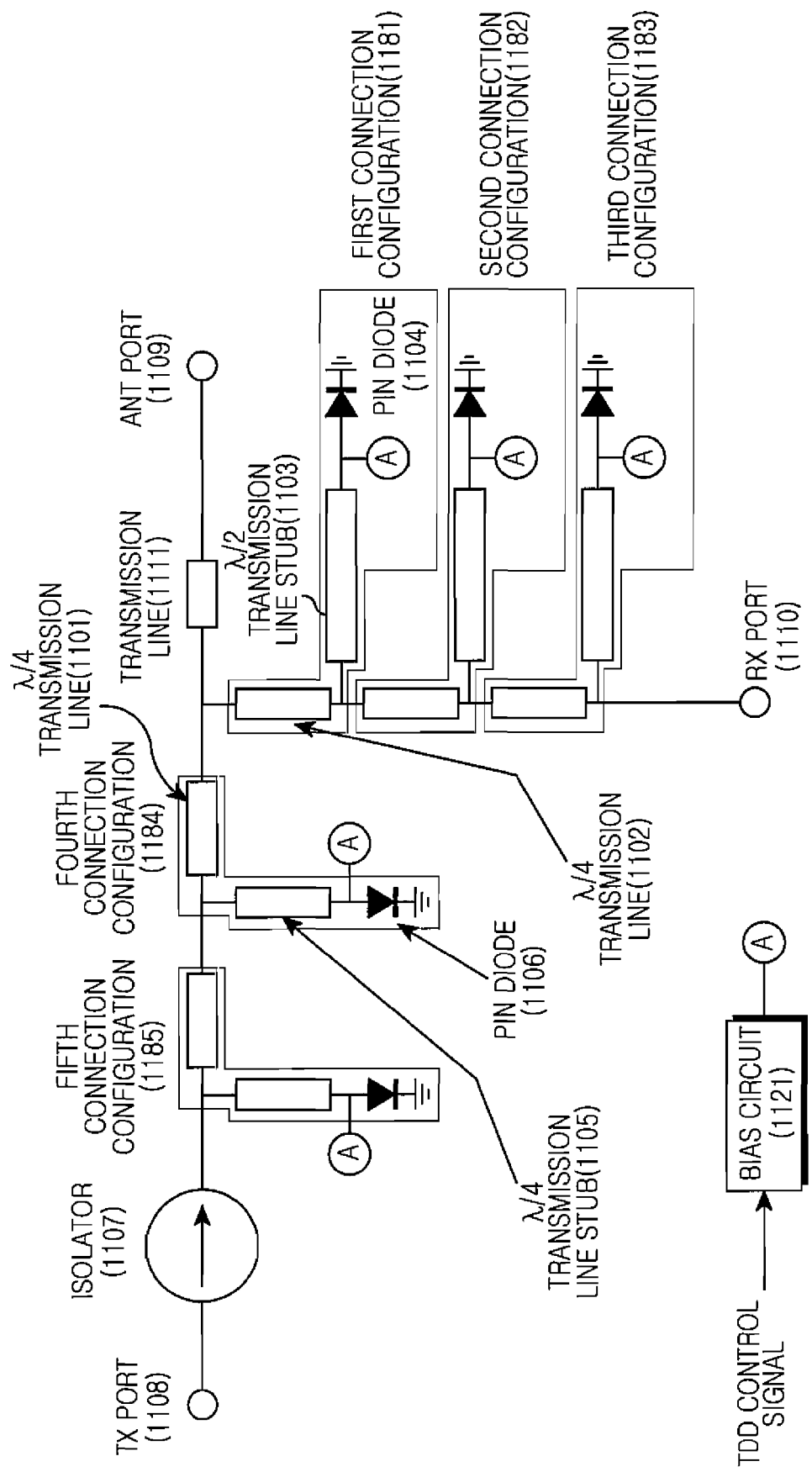
FIG. 11 illustrates a TDD switch having a plurality of connection configurations each illustrated in FIG. 7 according to an exemplary embodiment of the present invention.

FIG. 11 illustrates a TDD switch having a plurality of connection configurations similar to that illustrated in FIG. 7 according to an exemplary embodiment of the present invention.

Referring to FIG. 11, the TDD switch has three connection configurations (first to third connection configurations) 1181, 1182, and 1183 in which, similar to that shown in FIG. 7, the λ/4 transmission line 702 (here 1102), the λ/2 transmission line stub 703 (here 1103), and the pin diode 704 (here 1104) of FIG. 7 are connected, and two connection configurations (fourth and fifth connection configurations) 1184 and 1185 in which, similar to that shown in FIG. 7, the λ/4 transmission line stub 705 (here 1105), the λ/4 transmission line 701 (here 1101), and the pin diode 706 (here 1106) are connected. In general, isolation can be secured by about 20 dB per each connection configuration.

Components and operations of the TDD switch of FIG. 11 are substantially the same as those of FIG. 7. For example, the TDD switch of FIG. 11 includes a transmit port 1108, an isolator 1107, transmission line 1111, an antenna port 1109, a receive port 1110 and a bias circuit 1121.

Now, an exemplary TDD switch of the present invention will be described in terms of its performance with reference to a simulation test result as follows.

Figure 1:
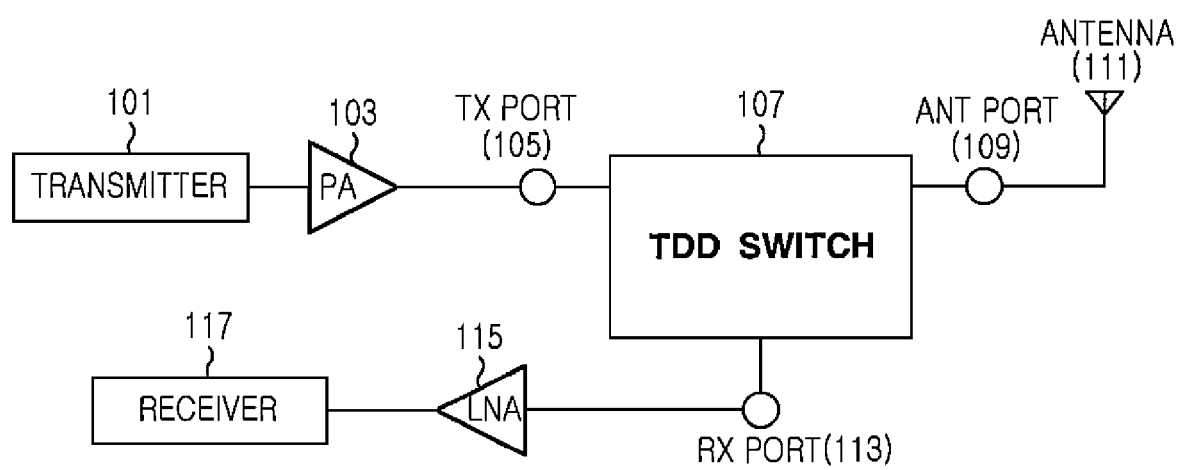
FIG. 1 illustrates a conventional TDD switch in a TDD wireless communication system.
Figure 2A:
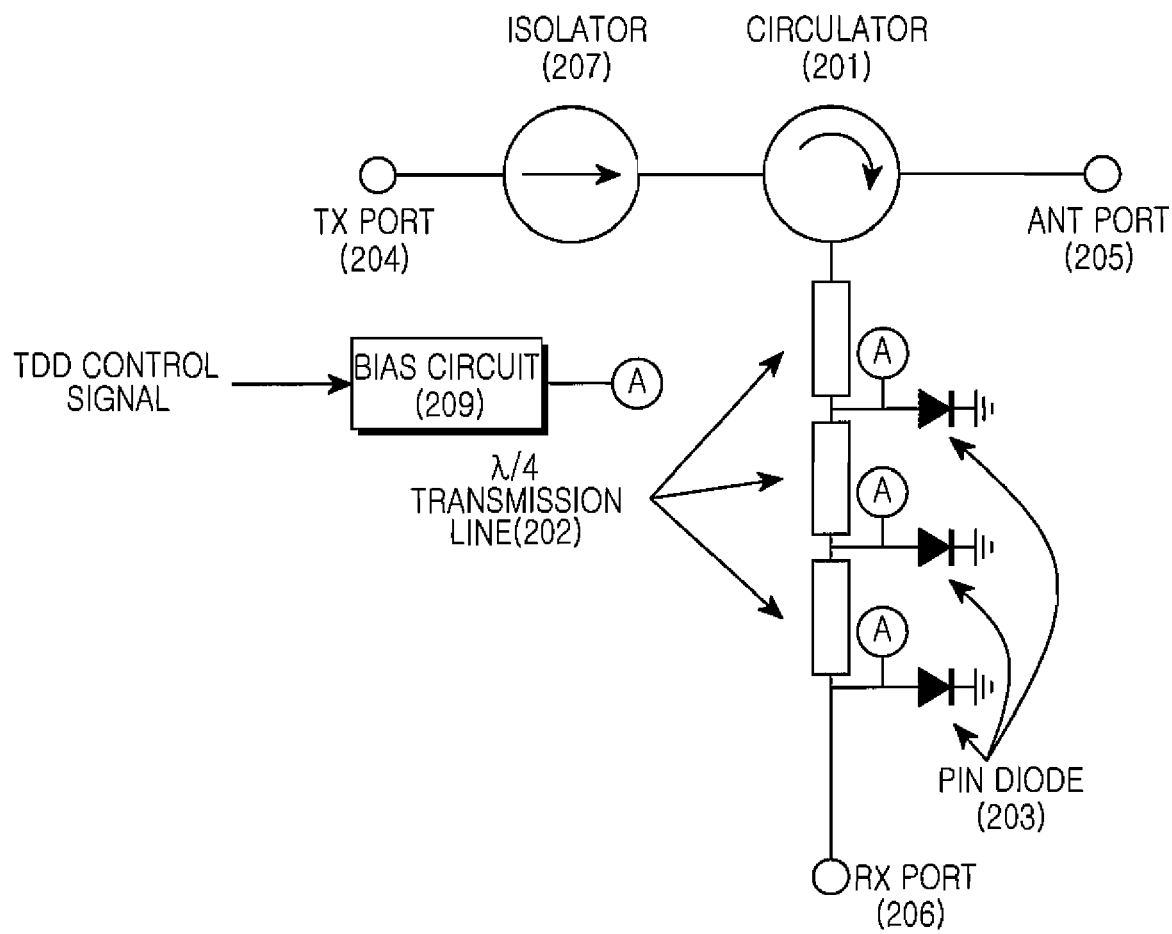
FIGS. 2A and 2B illustrate a conventional TDD switch having a circulator and a $\lambda/4$ transmission line.
Figure 2B:
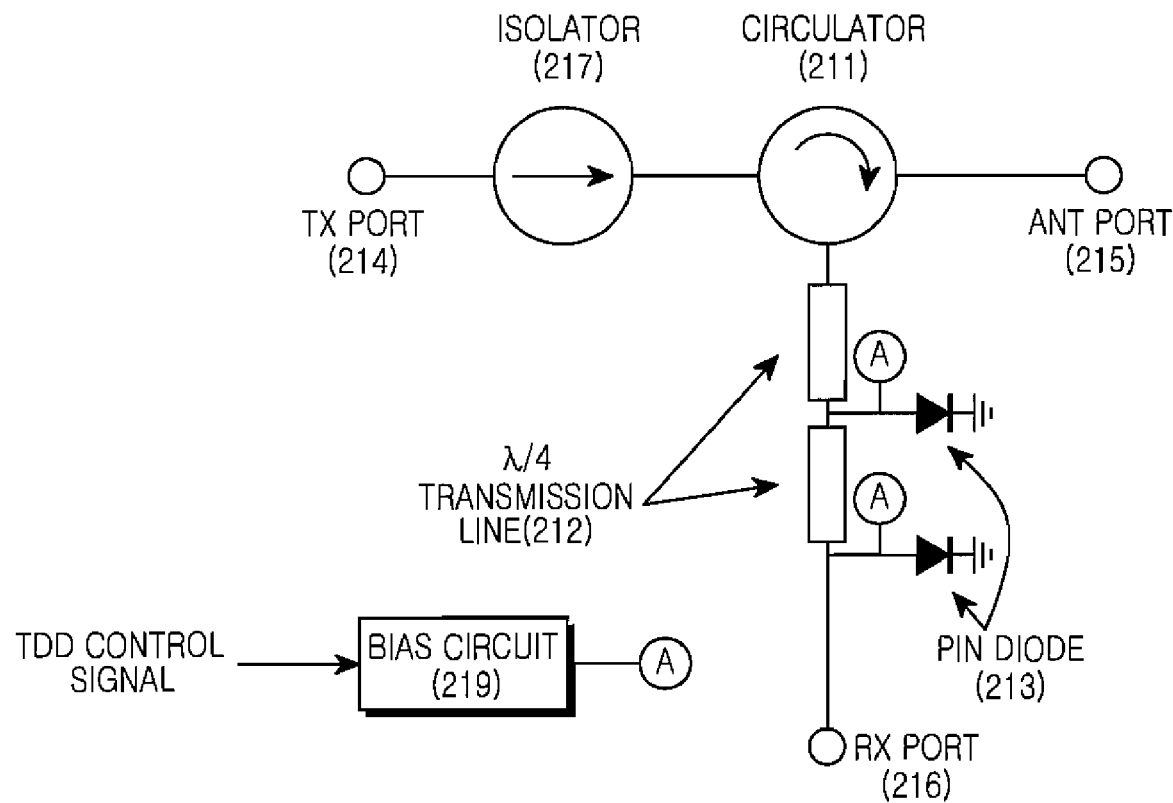
Figure 12A:
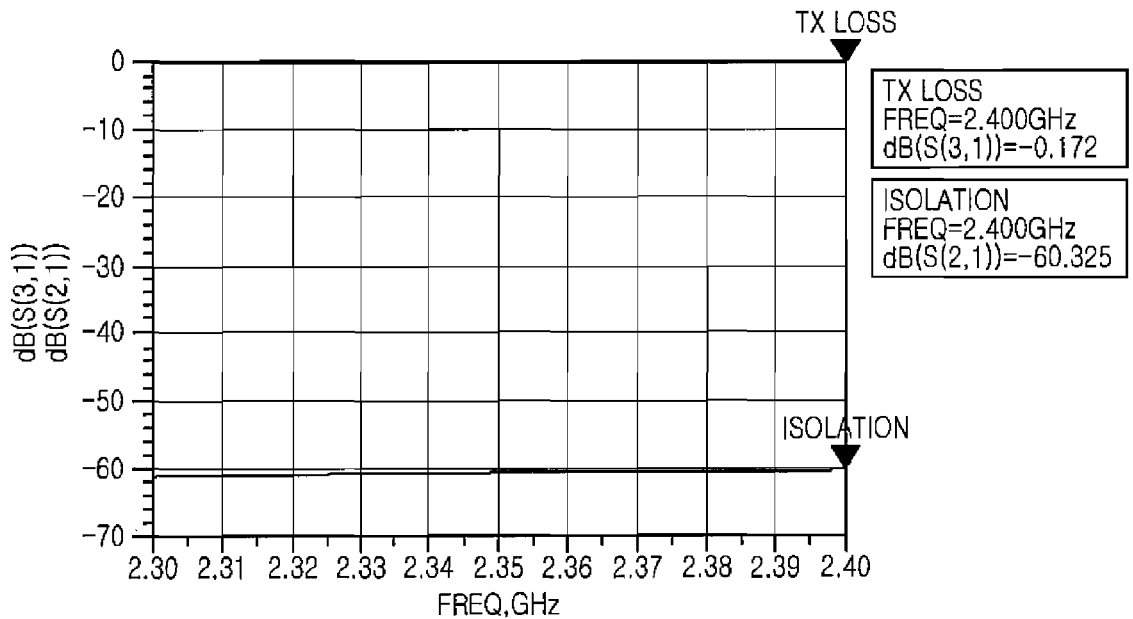
FIGS. 12A and 12B illustrate graphs showing a performance of the conventional TDD switch of FIG. 2B, which is obtained through a simulation test.
Figure 12B:
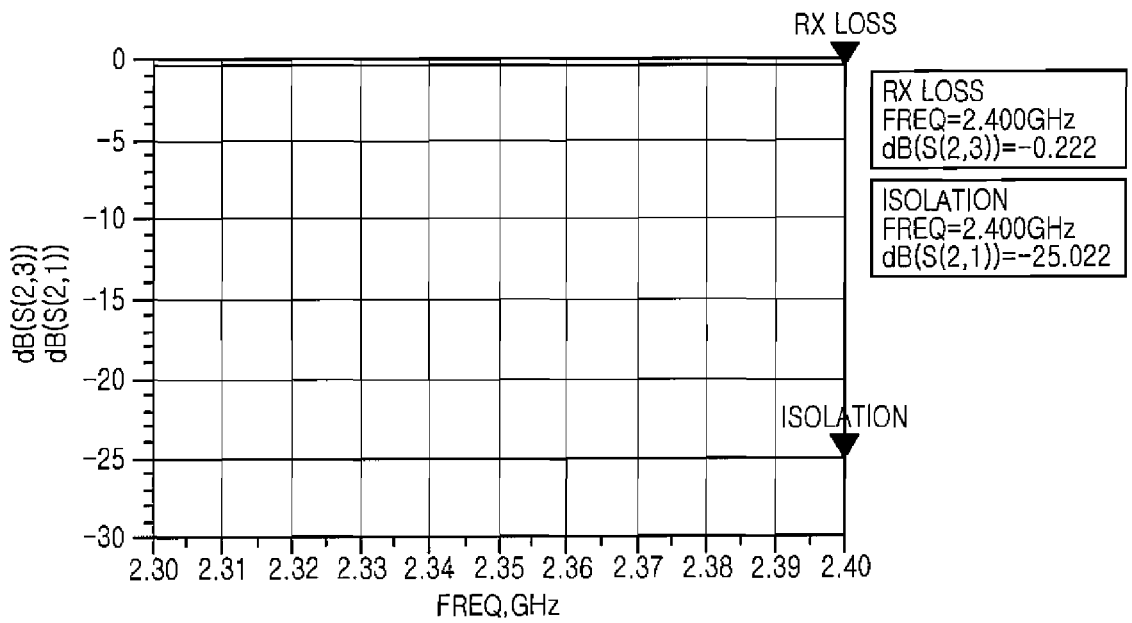

FIGS. 12A and 12B illustrate graphs showing a performance of the conventional TDD switch of FIG. 2B, which is obtained through a simulation test.

FIG. 12A shows a transmission loss, and FIG. 12B shows a reception loss. According to the graphs, the TDD of FIG. 2B has a performance in which a signal is attenuated by about 0.172 dB in the transmission mode and about 0.222 dB in the reception mode at a frequency range of 2300~2400 MHz. Isolation is 60.325 dB in the transmission mode and 25.022 dB in the reception mode.

Figure 3A:
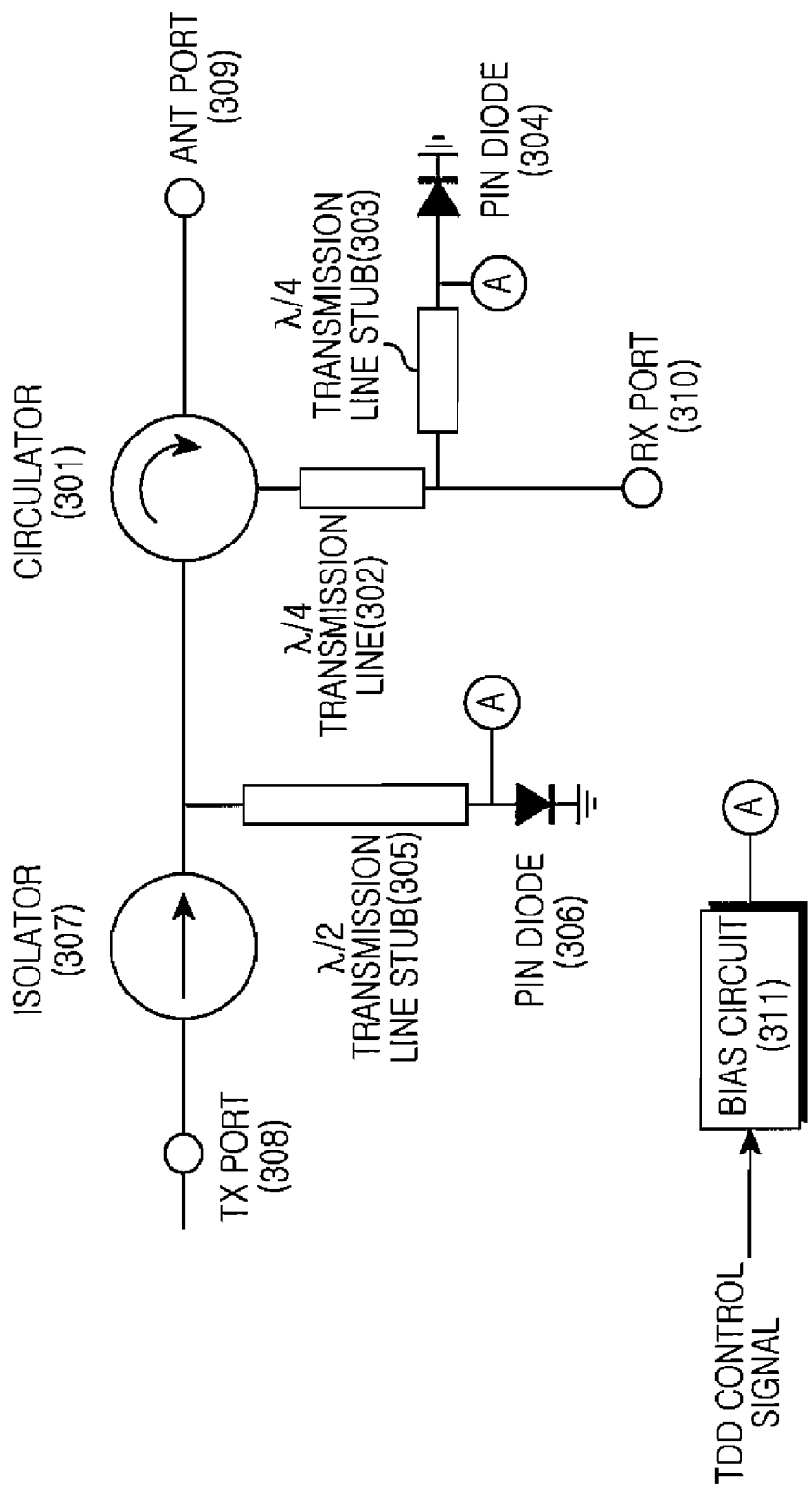
FIGS. 3A to 3C illustrate a conventional TDD switch having a circulator, a $\lambda/4$ transmission line, a $\lambda/4$ transmission line stub, and a $\lambda/2$ transmission line stub.
Figure 3B:
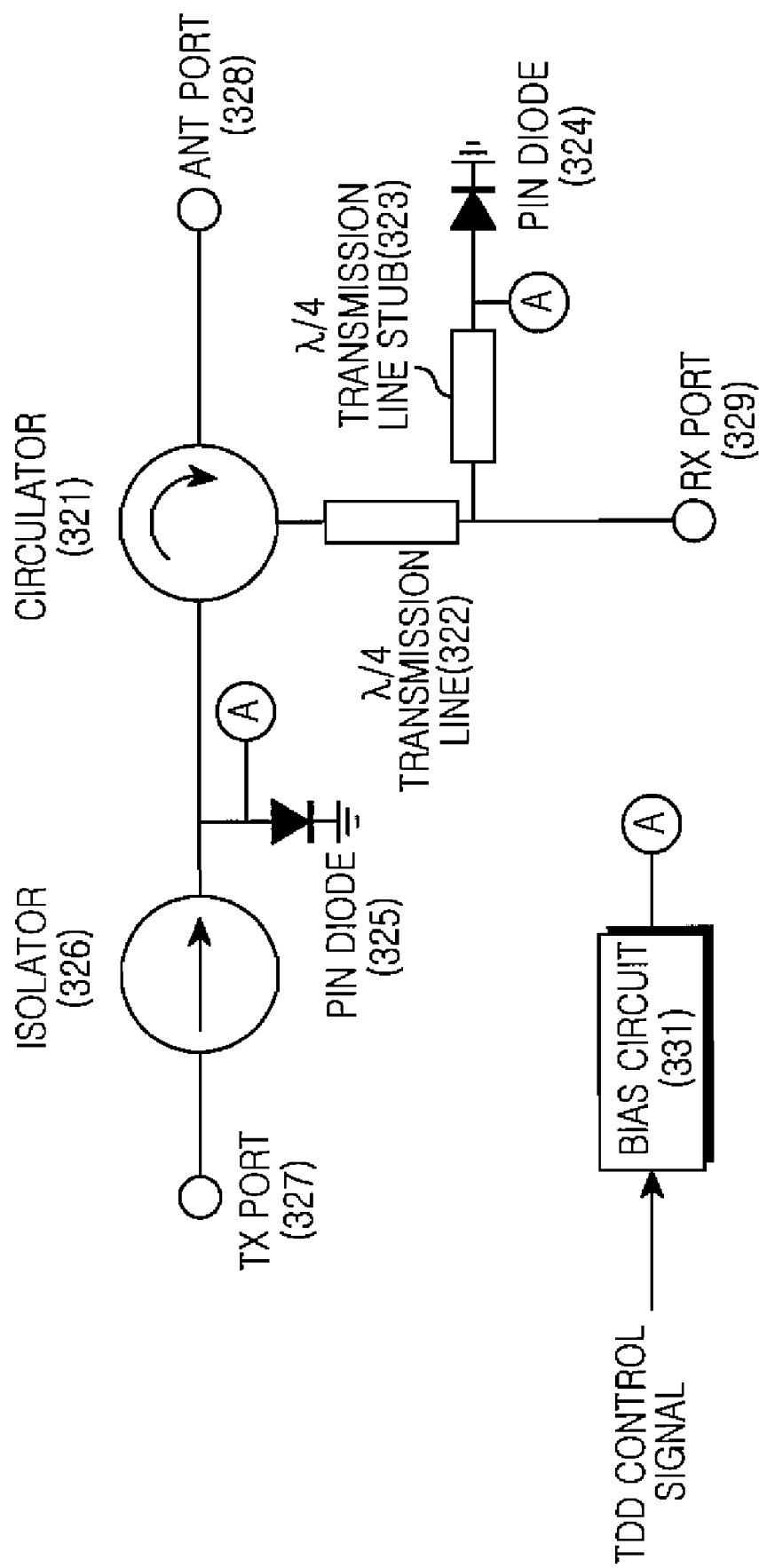
Figure 3C:
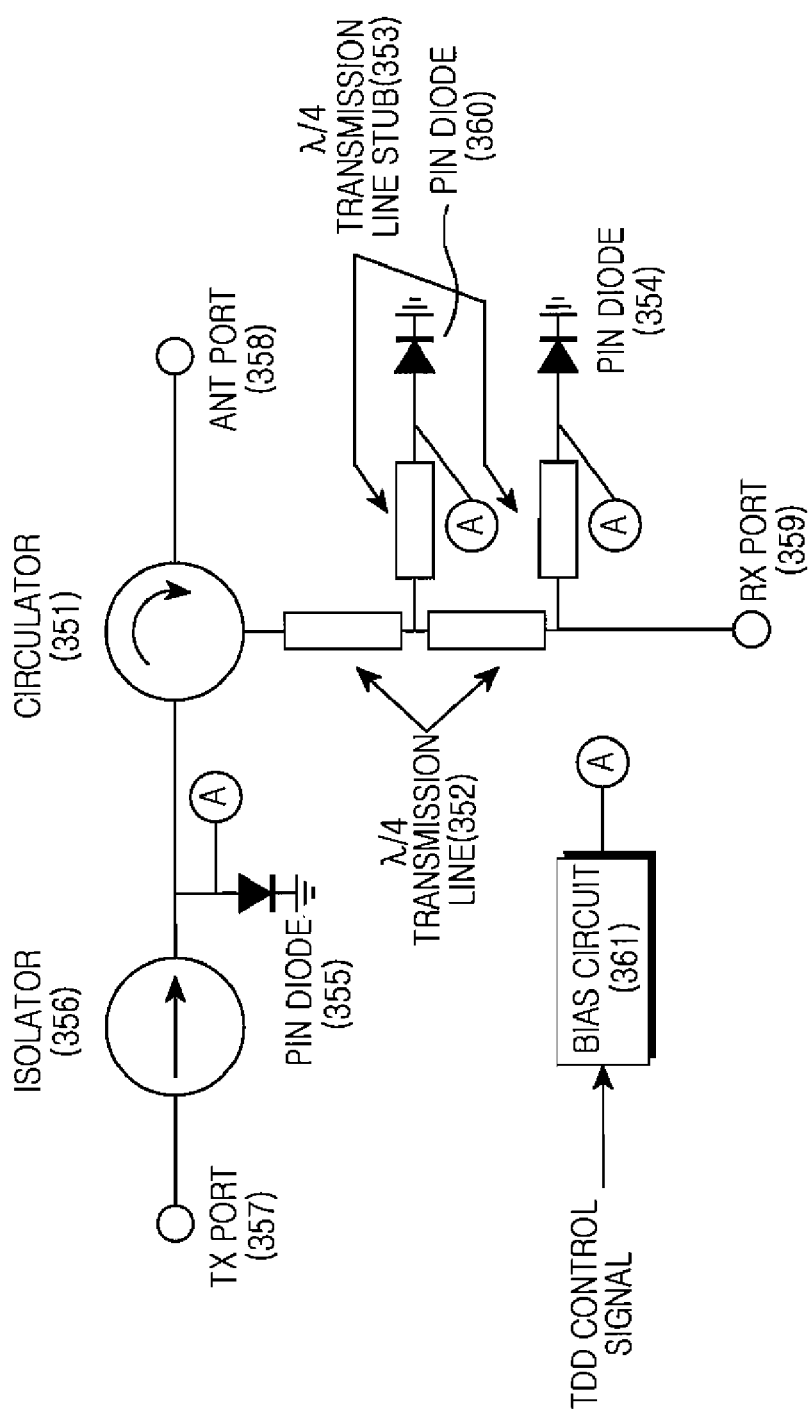
Figure 13A:
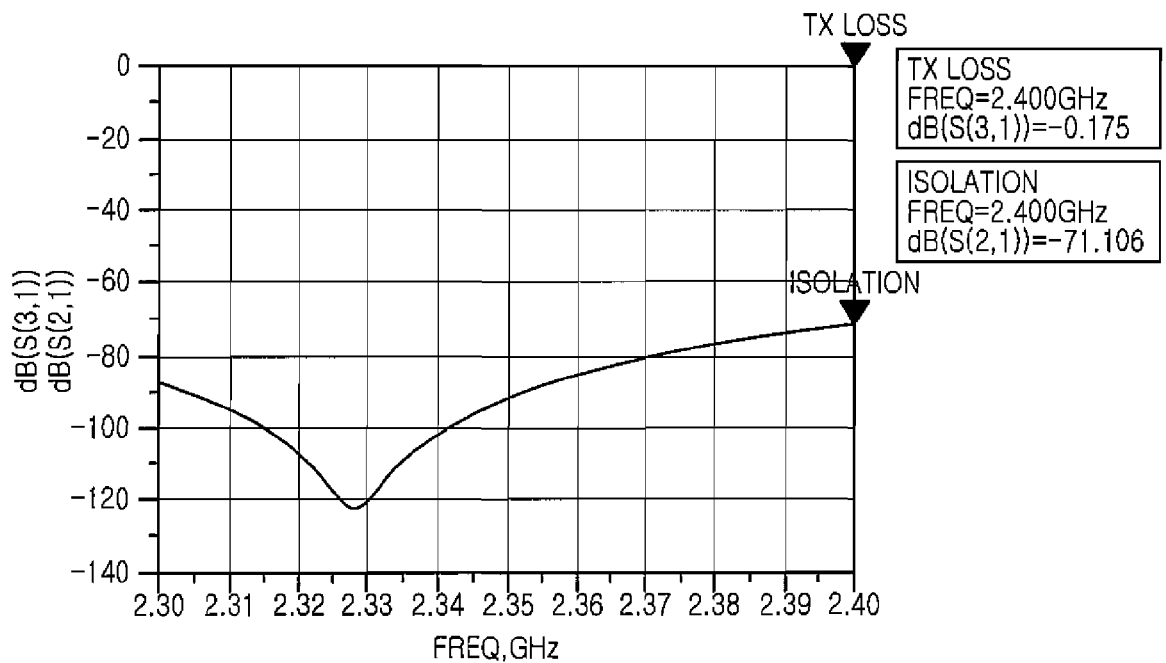
FIGS. 13A and 13B illustrate graphs showing a performance of the conventional TDD switch of FIG. 3C, which is obtained through a simulation test.
Figure 13B:
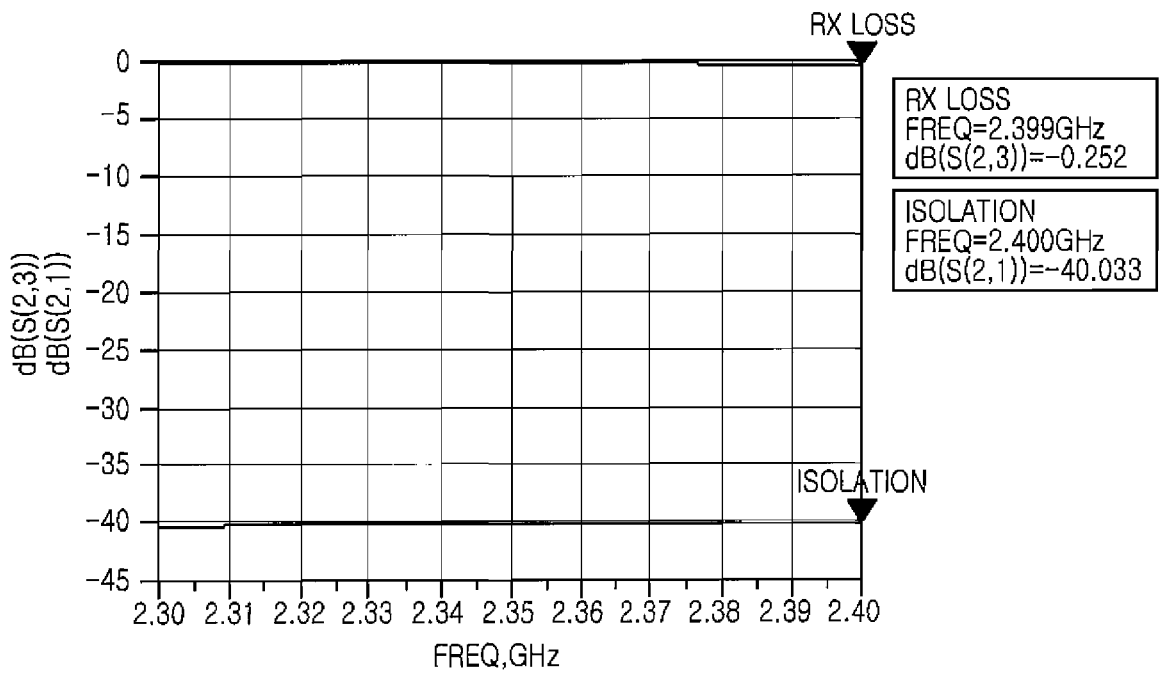

FIGS. 13A and 13B illustrate graphs showing a performance of the conventional TDD switch of FIG. 3C, which is obtained through a simulation test.

FIG. 13A shows a transmission loss, and FIG. 13B shows a reception loss. According to the graphs, the TDD of FIG. 3C has a performance in which a signal is attenuated by about 0.175 dB in the transmission mode and about 0.252 dB in the reception mode at a frequency range of 2300~2400 MHz. Isolation is 71.106 dB in the transmission mode and 40.033 dB in the reception mode.

Figure 14A:
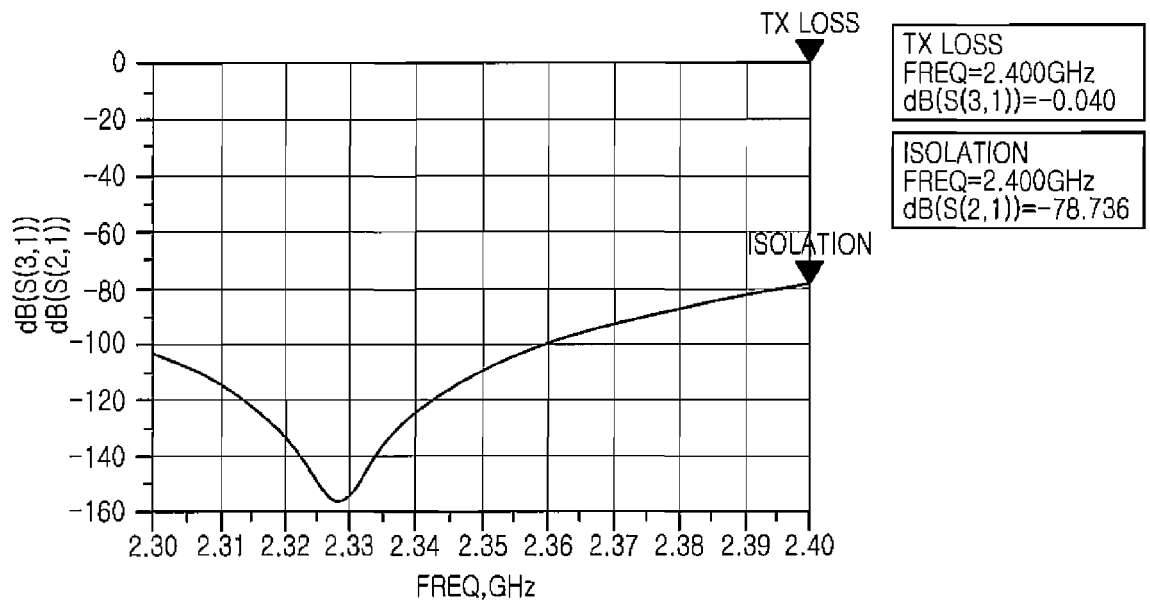
FIGS. 14A and 14B illustrate graphs showing a performance of a TDD switch as illustrated in FIG. 9 according to an exemplary embodiment of the present invention, which is obtained through a simulation test.
Figure 14B:
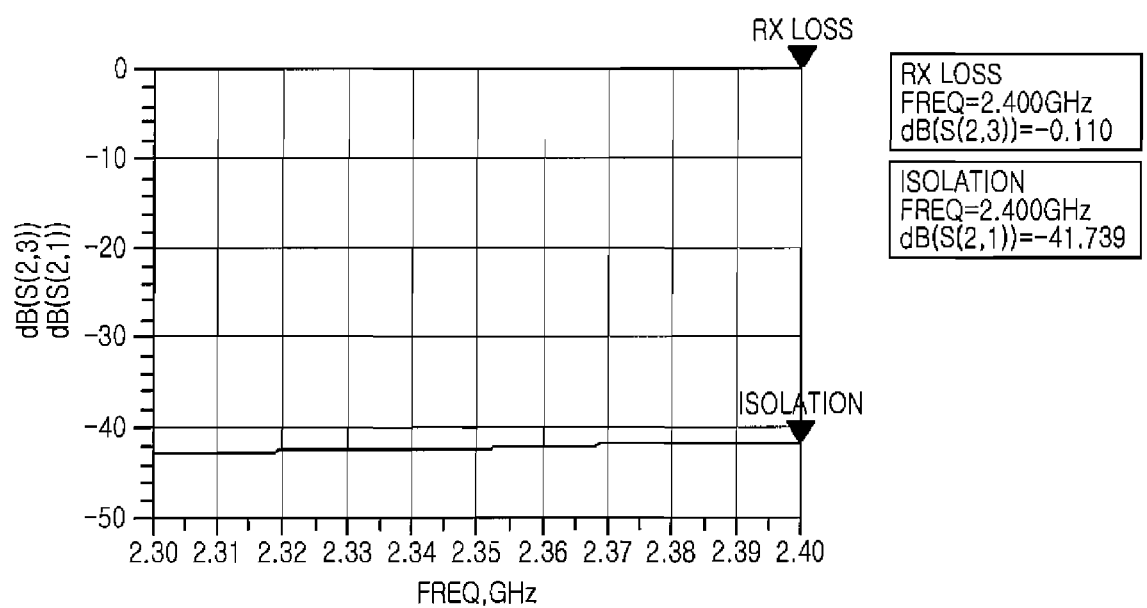

FIGS. 14A and 14B illustrate graphs showing a performance of the TDD switch of FIG. 9 according to an exemplary embodiment of the present invention, which is obtained through a simulation test.

FIG. 14A shows a transmission loss, and FIG. 14B shows a reception loss. According to the graphs, the TDD of FIG. 9 has a performance in which a signal is attenuated by about 0.04 dB in the transmission mode and about 0.11 dB in the reception mode at a frequency range of 2300~2400 MHz. Isolation is 78.736 dB in the transmission mode and 41.739 dB in the reception mode.

The simulation test results of FIGS. 12A, 12B, 13A, 13B, 14A and 14B show that the exemplary TDD switch of the present invention has a better performance without having to use the circulator as compared with the conventional TDD switch using the circulator.

According to the exemplary TDD switch of the present invention, a receiver can be protected even when errors occur in the TDD communication system. In addition, since a circulator is not required, an exemplary TDD switch can be realized while requiring a smaller mounting area and fewer components.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims and their equivalents.

What is claimed is:

1. A Time Division Duplex (TDD) switch in a wireless communication system, comprising:
    an isolator connected to an output port of a transmitter;
    a first transmission line connected between the isolator and an antenna feed line, for transmitting a transmission signal received from the isolator to the antenna feed line when in a transmission mode and for isolating a transmission path when in a reception mode;
    a first transmission line stub connected in a stub form between the isolator and the first transmission line for reflecting a transmission signal transmitted from the isolator in the transmission mode and for changing an impedance of the first transmission line in the reception mode;
    a second transmission line connected between an output port of the first transmission line and an input port of a receiver for isolating a reception path in the transmission mode and for providing a reception signal received from the antenna feed line to the receiver in the reception mode; and
    a second transmission line stub connected in a stub form between the second transmission line and the input port of the receiver, for controlling the second transmission line to isolate the reception path when in the transmission mode and for supplying the reception signal provided from the antenna feed line to the receiver when in the reception mode.

2. The TDD switch of claim 1, further comprising:
    a first switch connected between the first transmission line stub and a ground for switching in response to a TDD control signal; and
    a second switch connected between the second transmission line stub and the ground for switching in response to the TDD control signal.

3. The TDD switch of claim 2, wherein the first switch and the second switch comprise a first pin diode and a second pin diode respectively.

4. The TDD switch of claim 3, further comprising a Direct Current (DC) bias circuit for supplying a DC bias to the first and second pin diodes in response to the TDD control signal.

5. The TDD switch of claim 3, wherein the first transmission line, the second transmission line, the first transmission line stub, and the second transmission line stub each comprise a length as follows:
    the length of the first transmission line=$(\lambda/4)*(2a+1)$;
    the length of the second transmission line=$(\lambda/4)*(2b+1)$;
    the length of the first transmission line stub=$(\lambda/2)*c$; and
    the length of the second transmission line stub=$(\lambda/4)*(2d+1)$,
    where a, b, c and d are integer numbers equal to or greater than 0.

6. The TDD switch of claim 3, wherein the first transmission line, the second transmission line, the first transmission line stub, and the second transmission line stub each comprise a length as follows:
    the length of the first transmission line=$(\lambda/4)*(2a+1)$;
    the length of the second transmission line=$(\lambda/4)*(2b+1)$;
    the length of the first transmission line stub=$(\lambda/4)*(2c+1)$; and
    the length of the second transmission line stub=$(\lambda/2)*d$,
    where a, b, c and d are integer numbers equal to or greater than 0.

7. The TDD switch of claim 3, wherein the first transmission line stub and the first transmission line comprise an interconnection with one or more connection configurations between the isolator and the antenna feed line.

8. The TDD switch of claim 3, wherein the second transmission line stub and the second transmission line comprise an interconnection with one or more connection configurations between the antenna feed line and the receiver.

9. The TDD switch of claim 5, wherein the impedance of the first transmission line stub becomes substantially infinite when the first pin diode connected in the transmission mode comprises a substantially open circuit whereas becomes substantially 0 when the first pin diode comprises a circuit substantially shorted to ground in the reception mode.

10. The TDD switch of claim 5, wherein the first transmission line transmits the transmission signal provided from the isolator to the antenna feed line when the impedance of the first transmission line stub becomes nearly infinite in the transmission mode, and the first transmission line isolates the transmission path when the impedance of the first transmission line becomes nearly infinite in the reception mode.

11. The TDD switch of claim 5, wherein the impedance of the second transmission line stub becomes nearly 0 when the second pin diode connected in the transmission mode is switched off whereas becomes nearly infinite when the second pin diode is switched on in the reception mode.

12. The TDD switch of claim 5, wherein the impedance of the second transmission line becomes nearly infinite in the reception mode so as to isolate the reception path, and the impedance of the second transmission line stub becomes nearly infinite in the reception mode so as to transmit the reception signal provided from the antenna feed line to the receiver.

13. The TDD switch of claim 6, wherein the impedance of the first transmission line stub becomes nearly infinite when the first pin diode connected in the transmission mode is switched on whereas becomes nearly 0 when the first pin diode is switched off in the reception mode.

14. The TDD switch of claim 6, wherein the first transmission line transmits the transmission signal provided from the isolator to the antenna feed line when the impedance of the first transmission line stub becomes nearly infinite in the transmission mode, and the first transmission line isolates the transmission path when the impedance of the first transmission line stub becomes nearly 0 in the reception mode.

15. The TDD switch of claim 6, wherein the impedance of the second transmission line stub becomes nearly 0 when the second pin diode connected in the transmission mode is switched on whereas becomes nearly infinite when the second pin diode is switched off in the reception mode.

16. The TDD switch of claim 6, wherein the impedance of the second transmission line becomes nearly infinite in the transmission mode so as to isolate the reception path, and the impedance of the second transmission line stub becomes nearly infinite in the reception mode so as to transmit the reception signal provided from the antenna feed line to the receiver.

17. A Time Division Duplex (TDD) switch in a wireless communication system, comprising:
an isolator connected to an output port of a transmitter;
a first transmission line connected between the isolator and an antenna, for transmitting a transmission signal received from the isolator to the antenna when in a transmission mode and for isolating a transmission path when in a reception mode;
a first switch connected between the isolator and the first transmission line for changing an impedance of the first transmission line in the reception mode;
a second transmission line connected between an output port of the first transmission line and an input port of a receiver for isolating a reception path in the transmission mode and for providing a reception signal received from the antenna to the receiver in the reception mode; and
a second switch connected between the second transmission line and the input port of the receiver, for controlling the second transmission line to isolate the reception path when in the transmission mode and for controlling the second transmission line to provide the reception signal from the antenna to the receiver when in the reception mode.

18. The TDD switch of claim 17, wherein the first switch comprises a first transmission line stub and wherein the second switch comprises a second transmission line stub.

19. The TDD switch of claim 18, further comprising
a first pin diode connected between the first transmission line stub and a ground for switching in response to a TDD control signal; and
a second pin diode connected between the second transmission line stub and the ground for switching in response to the TDD control signal.

20. The TDD switch of claim 19, wherein the first switch comprises a substantially open circuit in the transmission mode and a substantially grounded circuit in the reception mode and wherein the second switch comprises a substantially grounded circuit in the transmission mode and a substantially open circuit in the reception mode.

* * * * *